United States Patent
Tsunomoto et al.

(10) Patent No.: US 7,164,923 B2
(45) Date of Patent: Jan. 16, 2007

(54) INFORMATION TERMINAL DEVICE AND PC CARD THAT A USER CAN EASILY FIND A HOT SPOT TO ACCESS A WIRELESS LAN

(75) Inventors: Yasunori Tsunomoto, Kanagawa (JP); Yoshikazu Kobayashi, Kanagawa (JP)

(73) Assignee: NEC Infrontia Corporation, Kanagawa (JP)

( * ) Notice: Subject to any disclaimer, the term of this patent is extended or adjusted under 35 U.S.C. 154(b) by 297 days.

(21) Appl. No.: 10/724,153

(22) Filed: Dec. 1, 2003

(65) Prior Publication Data

US 2004/0127252 A1 Jul. 1, 2004

(30) Foreign Application Priority Data

Nov. 29, 2002 (JP) .............................. 2002/347653

(51) Int. Cl.
*H04Q 7/20* (2006.01)

(52) U.S. Cl. ............................... 455/456.1; 455/456.2; 455/456.3; 455/456.6; 455/422.1; 455/558; 455/557; 709/231; 709/219

(58) Field of Classification Search .............. 455/456.1, 455/456.2, 456.3, 456.6, 456.5, 422.1, 557, 455/558, 554.2, 550.1, 556.2; 709/231, 219
See application file for complete search history.

(56) References Cited

U.S. PATENT DOCUMENTS

| | | | | |
|---|---|---|---|---|
| 6,029,069 A * | 2/2000 | Takaki | ...................... | 455/456.1 |
| 6,259,405 B1 * | 7/2001 | Stewart et al. | .............. | 342/457 |
| 6,650,902 B1 * | 11/2003 | Richton | .................... | 455/456.3 |
| 6,654,683 B1 * | 11/2003 | Jin et al. | ..................... | 701/207 |
| 6,757,544 B1 * | 6/2004 | Rangarajan et al. | ..... | 455/456.1 |
| 6,922,634 B1 * | 7/2005 | Odakura et al. | ............ | 701/211 |
| 2002/0006788 A1 * | 1/2002 | Knutsson et al. | ........... | 455/422 |
| 2002/0022491 A1 * | 2/2002 | McCann et al. | ............ | 455/456 |
| 2002/0075853 A1 * | 6/2002 | Yoshida et al. | ............. | 370/352 |
| 2004/0019584 A1 * | 1/2004 | Greening et al. | .............. | 707/1 |
| 2004/0152472 A1 * | 8/2004 | Ono et al. | ............... | 455/456.1 |

FOREIGN PATENT DOCUMENTS

| | | | |
|---|---|---|---|
| JP | 06-236145 A | | 8/1994 |
| JP | 10-322355 A | | 12/1998 |
| JP | 11-69404 A | | 3/1999 |
| JP | 2000-298034 A | | 10/2000 |
| JP | 2001-257777 A | | 9/2001 |
| JP | 2002-71377 A | | 3/2002 |
| JP | 2002-163268 A | | 6/2002 |
| JP | 2002-217813 A | | 8/2002 |
| JP | 2002-236632 A | | 8/2002 |

* cited by examiner

*Primary Examiner*—Jean Gelin
*Assistant Examiner*—Khai Nguyen
(74) *Attorney, Agent, or Firm*—Sughrue Mion, PLLC

(57) ABSTRACT

An information terminal device includes a wireless local area network (LAN) access section, a search section and a display section. The wireless local area network (LAN) access section accesses a wireless LAN. The search section searches a hot spot in or near a desire place based on a desire place data indicating the desire place. The hot spot is a place where a wireless LAN connection can be established. The desire place is a place where a user desires to access a wireless LAN. The display section displays a hot spot data indicating a place of the hot spot searched by the search section.

33 Claims, 17 Drawing Sheets

| TELEPHONE NUMBER | HOT SPOT POSITION | AREA |
|---|---|---|
| 03-3213-4567 | a-1 | A |
| 03-3213-4568 | a-1 | A |
| 03-3213-4569 | a-1 | A |
| 03-3213-4570 | a-2 | A |
| 03-3213-4571 | b-1 | B |
| 03-3213-4572 | b-2 | B |
| : | : | : |
| 03-3321-4567 | n-1 | N |
| : | : | : |

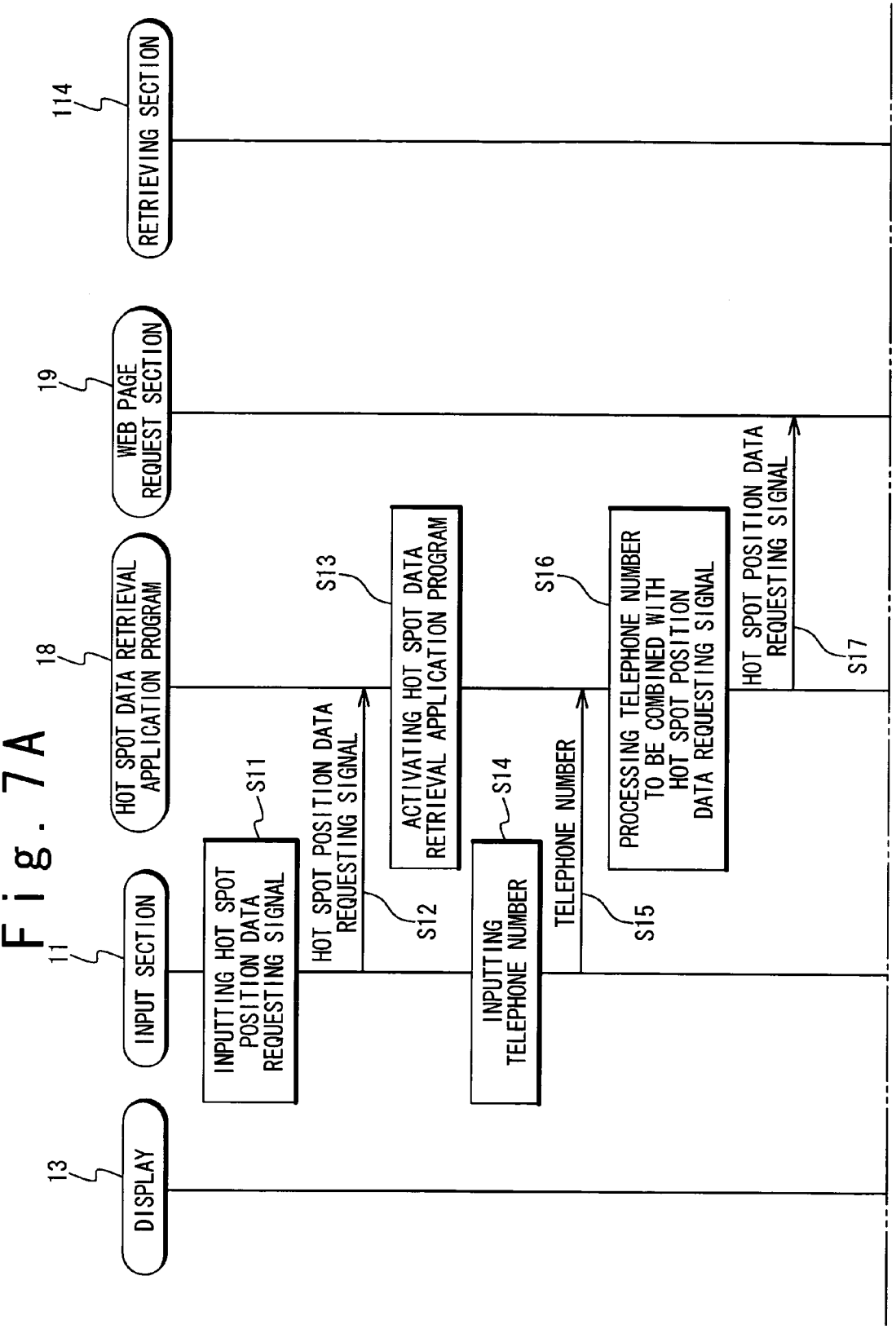

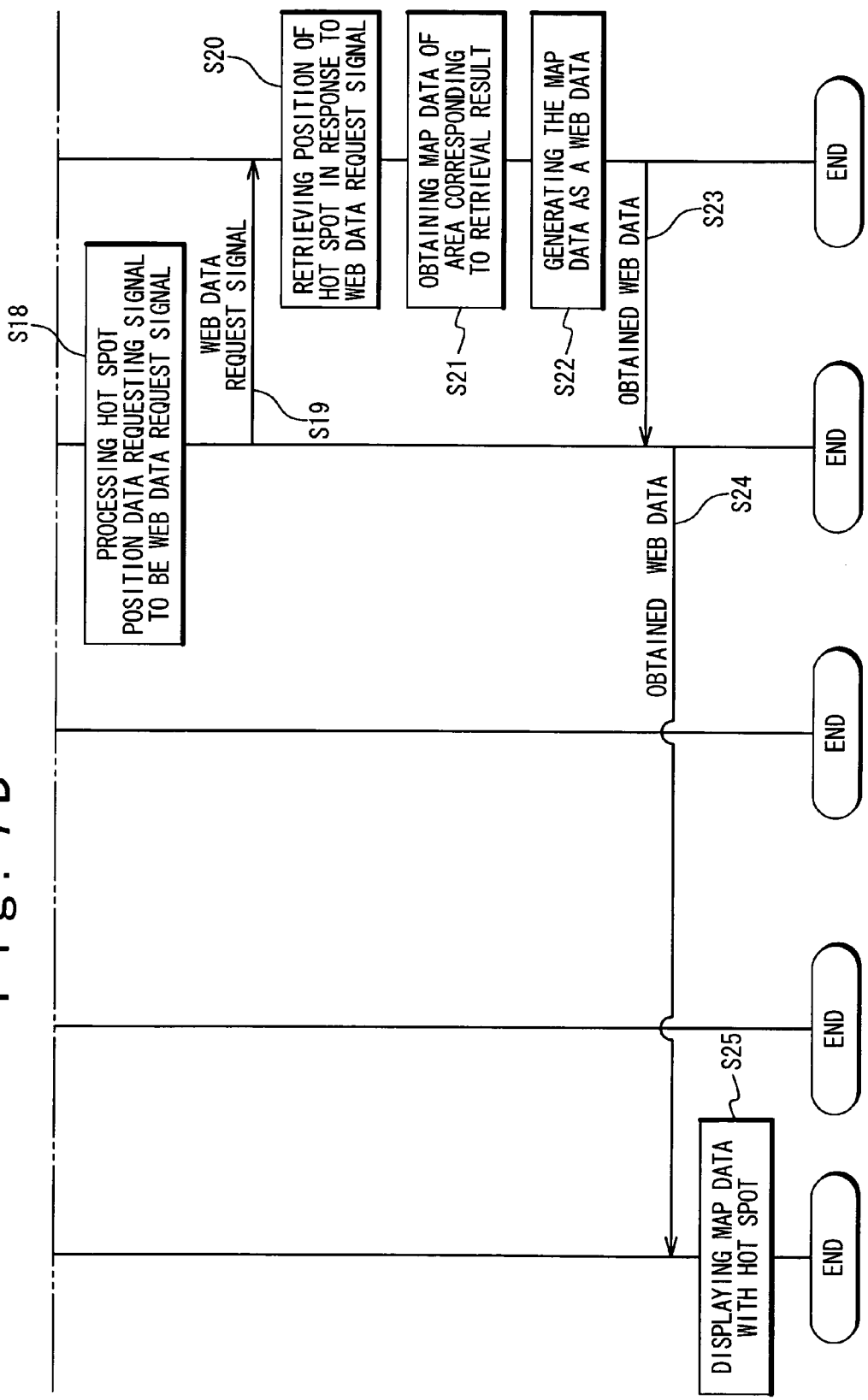

Fig. 8

| TELEPHONE NUMBER (AREA CODE) | AREA |
|---|---|
| 03 | XA |
| 045 | XB |
| 048 | XC |
| ⋮ | ⋮ |

Fig. 11

| ADDRESS | HOT SPOT POSITION | AREA |
|---|---|---|
| XX-TOWN, SINAGAWA-KU, TOKYO | a-1 | A |
| XX-TOWN, SINAGAWA-KU, TOKYO | a-1 | A |
| XX-TOWN, SINAGAWA-KU, TOKYO | a-2 | A |
| XX-TOWN, SINAGAWA-KU, TOKYO | a-2 | A |
| XX-TOWN, SINAGAWA-KU, TOKYO | a-2 | A |
| XX-TOWN, SINAGAWA-KU, TOKYO | a-3 | A |
| XX-TOWN, SINAGAWA-KU, TOKYO | b-1 | B |
| XX-TOWN, SINAGAWA-KU, TOKYO | b-1 | B |
| XX-TOWN, SINAGAWA-KU, TOKYO | b-2 | B |
| ⋮ | ⋮ | ⋮ |
| YY-TOWN, SINAGAWA-KU, TOKYO | n-1 | N |
| ⋮ | ⋮ | ⋮ |

Fig. 12

| ZIP CODE | AREA |
|---|---|
| 171-0001 | XA-11 |
| 171-0002 | XA-11 |
| 171-0003 | XA-12 |
| ⋮ | ⋮ |
| 171-0456 | XA-1n |

Fig. 16

| HOT SPOT POSITION | USER LICENSING | PROCEDURE AND DATE OF SERVICE CONTACT |
|---|---|---|
| a-1 | | |
| a-2 | | |
| b-1 | | |
| b-2 | | |
| ⋮ | | |
| n-1 | | |
| ⋮ | | |

Fig. 17

| HOT SPOT POSITION | AUTHENTICATION |
|---|---|
| a-1 | |
| a-2 | |
| b-1 | |
| b-2 | |
| ⋮ | |
| n-1 | |
| ⋮ | |

INFORMATION TERMINAL DEVICE AND PC CARD THAT A USER CAN EASILY FIND A HOT SPOT TO ACCESS A WIRELESS LAN

BACKGROUND OF THE INVENTION

1. Field of the Invention

The present invention relates to an information terminal device and a PC card, more particularly, relates to an information terminal device and a PC card which a user can easily find a hot spot and access a wireless local area network (LAN).

2. Description of the Related Art

A wireless LAN can be used in a hot spot. In the hot spot, the user can establish a wireless LAN connection by using an information terminal device. However, the user does not know the places of the hot spots in many cases. For this reason, the user can not use the wireless LAN at the place where the user visits for the first time or an unknown place in many cases. That is, in order to use the wireless LAN actually, it is necessary to examine to know the place of the hot spot in advance.

In conjunction with the above description, Japanese Laid Open Patent Application (JP2002-236632A) discloses the telecommunications system. The object of this technique is to provide a seamless system, device and method capable of reducing a communication fee, capable of providing stable communication quality, and capable of quickening an information transmission rate, in Internet connection from a moving environment.

The telecommunications system includes an information terminal and a predetermined server that can be connected each other through the Internet. The information terminal includes a mobile communication machine, a radio information communication device, a positioning means, and a distribution demand transmitting means. The mobile communication machine connects with mobile communication system. The radio information communication device connects with the access point of the radio communications system which exists in at least one different point, and possibly connected with the Internet. The positioning means measures a position and outputs a measuring result. The distribution demand transmitting means connects with the predetermined server using the mobile communications machine or the radio information communication device, and sends out at least an information distribution demand to the predetermined server. Moreover, the predetermined server includes an access point information database and a distribution means. The access point information database classifies access point information including a position and an effective range of an electric wave of at least one access point by at least one access point and stores it. The distribution means receives the information distribution demand from the information terminal, and sends the content of the access point information database to the information terminal that sends the information distribution demand. Furthermore, the information terminal includes an information receiving means and a connection control means. The information receiving means receives the content of the access point information database from the predetermined server. The connection control means controls to use the radio information communication device for Internet connection in the effective range of the electric wave of the access point based on the received content of the access point database and the measuring result of the measuring means.

Japanese Laid Open Patent Application (JP2000-298034A) discloses a wireless communication system. The object of this technique is to realize a system providing navigation information that is usable for a pedestrian by using radio signal under special conditions such as in-house.

A wireless communication system includes a plurality of transmitting means, a transmitting-side control means and a portable information terminal. The plurality of transmitting means is arranged in a predetermined field and transmits a radio signal. The transmitting-side control means controls to make the positional information of each of plurality of the transmitting means in the predetermined field transmit to each of plurality of the transmitting means. The portable information terminal includes an information means, a receiving means, a storage means and a receiving-side control means. The information means reports information to a user. The receiving means receives the positional information transmitted by the plurality of transmitting means. The storage means stores the map information in the predetermined field. The receiving-side control means controls to make the information means report the map information in the predetermined field memorized by the positional information received by the receiving means.

Japanese Laid Open Patent Application (JPH10-322355A) discloses a portable information device. The object of this technique is to build up the optimum portable information device to realize a mobile computing by integrating an antenna for a wireless local area network LAN with a personal computer main body so as to configure the device compact.

A portable information device equips a PCMCIA slot with a PC card which realizes wireless LAN, and includes an antenna receiving an electric wave and a cable which transmits received data from the antenna to the PC card in a main body.

Japanese Laid Open Patent Application (JPH06-236145A) discloses a navigation system. The object of this technique is to provide a navigation system having a regional map retrieving means which can retrieve a detailed map for a desired region by only inputting a telephone number or a regional number such as a postal code number and the like.

The navigation system of which a controller section connects with an operation section, display section and a map storing section, includes a regional number storing apparatus and a regional map retrieving means. The regional number storing apparatus stores a regional number corresponding to a map data. The regional map retrieving means retrieves a regional map corresponding to an inputted regional number, and displays it to the display.

Japanese Laid Open Patent Application (JP2002-217813A) discloses a navigation system. The object of this technique is to suppress communication cost at receiving of navigation service and also to enable, even for persons other than telecommunications enterprises to provide a service.

A navigation system includes a service provider network, a communication entrepreneur network, a service provision management center, a position information providing terminal, a base station and a wireless communication terminal. The service provision management center is connected with both the service provider network and the communication entrepreneur network. The position information providing terminal is connected with the service provider network. The base station is connected with the communication entrepreneur network. The wireless communication terminal carries out a short-distance wireless communication with the position information providing terminal, and carries out a wireless communication with the base station. The wireless communication terminal registers a service use registration for the service provision management center through the base station and the communication entrepreneur network, when starting a navigation service. After registering the service use registration, the wireless communication terminal receives the service from the position information providing terminal.

Japanese Laid Open Patent Application (JP2002-163268A) discloses a map browsing service system. The object of this technique is to provide a map browsing service system and a printed matter for map browsing service for easily visibly displaying a map and characters when displaying the characters on a small display of a cellular phone together with the map.

A map browsing service system includes a data providing means to provide a map data to a mobile telephone terminal. The map data includes a map and a character data. The map contains a point specified by reference characters inputted from the mobile telephone terminal. The character data contains the katakana, the alphabet, signs and the numeric character.

Japanese Laid Open Patent Application (JP2002-071377A) discloses a navigation system for pedestrians. The object of this technique is to provide a navigation system for pedestrians which allows works, such improving the specifications for a processor to be executed easily, and is superior in portability and handling of the pedestrians.

The navigation system for pedestrians includes a positional information detecting section and a processing section. The positional information detecting section detects a pedestrian's positional information. The processing section is estranged physically with the positional information detecting section. The processing section receives the positional information by wireless communication from the position information detecting section, searches path information based on the positional information and destination information inputted by the pedestrian, and displays it to the pedestrian.

SUMMARY OF THE INVENTION

Therefore, an object of the present invention is to provide an information terminal device and a PC card that a user can easily find a hot spot to access a wireless LAN, even if the user does not know a place (position, location) of the hot spot.

Another object of the present invention is to provide an information terminal device and a PC card that a user can visually know a place of a hot spot, even if the user does not know the place of the hot spot, and can access and use a wireless LAN.

Still another object of the present invention is to provide an information terminal device and a PC card that a user can know a place of a hot spot from information already known (obtained) by the user, even if the user does not know the detailed information with regard to the retrieval of the hot spot.

Yet still another object of the present invention is to provide an information terminal device and a PC card that a user can know information of a hot spot truly close to a location where the user desires to use a wireless LAN.

It is also an object of the present invention to provide information terminal device and a PC card that can always have the newest information of information of a hot spot targeted for retrieval.

It is also another object of the present invention to provide information terminal device and a PC card that a user can easily selects a usable hot spot.

It is also still another object of the present invention to provide information terminal device and a PC card that it is not necessary to again set a data required when a user accesses a hot spot.

In order to achieve an aspect of the present invention, the present invention provides an information terminal device including: a wireless local area network (LAN) accesses section, a search section and a display section. The wireless local area network (LAN) accesses section access a wireless LAN. The search section searches a hot spot in or near a desire place based on a desire place data indicating the desire place. The hot spot is a place where a wireless LAN connection can be established. The desire place is a place where a user desires to access a wireless LAN. The display section displays a hot spot data indicating a place of the hot spot searched by the search section.

An information terminal device includes a wireless local area network (LAN) accesses section, a sending section, a receiving section and a display section. The wireless local area network (LAN) accesses section accesses a wireless LAN. The sending section sends a desire place data to a server. The desire place data indicates a desire place where a user desires to access a wireless LAN. The receiving section receives a hot spot data from the server. The hot spot data indicates a place of a hot spot in or near the desired place searched by the server based on the desire place data. The hot spot is a place where a wireless LAN connection can be established. The display section displays the hot spot data.

In the information terminal device of the present invention, the desire place data includes a telephone number of the desire place.

The information terminal device of the present invention, further includes a first memory section which stores a first table data including a relationship between a plurality of telephone numbers and a plurality of hot spots. The each of the plurality of telephone numbers corresponds to one of the plurality of hot spots. The plurality of hot spots is in or near a place corresponding to one of the plurality of telephone numbers. The search section searches the hot spot based on the first table data.

In the information terminal device of the present invention, the desire place data includes an address of the desire place.

The information terminal device of the present invention, further includes a second memory section which stores a second table data including a relationship between a plurality of addresses and a plurality of hot spots. The each of the plurality of addresses corresponds to one of the plurality of hot spots. The plurality of hot spots is in or near a place corresponding to one of the plurality of addresses. The search section searches the hot spot based on the second table data.

In the information terminal device of the present invention, the first table data further includes a data indicating a relationship between the plurality of telephone numbers and a plurality of maps each of which corresponds to the plurality of hot spots. Each of the plurality of telephone numbers corresponds to one of the plurality of maps. The display section displays the one of plurality of maps.

In the information terminal device of the present invention, the second table data further includes a data indicating a relationship between the plurality of addresses and a plurality of maps each of which corresponds to the plurality of hot spots. Each of the plurality of addresses corresponds to one of the plurality of maps. The display section displays the one of plurality of maps.

In the information terminal device of the present invention, the desire place data includes an area code for a telephone number of the desire place. The search section searches an area map data indicating a map of an area that corresponds to the area code. The display section displays the area map data searched by the search section. The search section searches the hot spot data of the hot spot in or near a specific area that is a part of the area and selected by the user.

In the information terminal device of the present invention, the desire place data includes a zip code for the desire place. The search section searches an area map data indicating a map of an area that corresponds to the zip code. The display section displays the area map data searched by the search section. The search section searches the hot spot data of the hot spot in or near a specific area that is a part of the area and selected by the user.

In the information terminal device of the present invention, the hot spot data includes a first map data indicating a first area containing the place of the hot spot. The display section displays one of the first map data and a second map data indicating a second area containing the first area. The display section displays places of hot spots that are in the second area except for the first area.

In the information terminal device of the present invention, the search section updates the hot spot data without any operation by the user.

In the information terminal device of the present invention, the display section displays a first hot spot and a second hot spot distinguishably. The first hot spot can be used for the user. The second hot spot can not be used for the user.

The information terminal device of the present invention, further includes a memory which stores a setting data that is used for accessing the wireless LAN in the hot spot and was stored when accessing the wireless LAN last time in the hot spot.

In the information terminal device of the present invention, wherein the desire place data is inputted by the user.

In the information terminal device of the present invention, the desire place data is the place that the information terminal device detects.

In order to achieve another aspect of the present invention, the present invention provides a PC card which is connected with an information terminal device with a display section and used for accessing a wireless local area network (LAN) including a search section. The search section searches a hot spot in or near a desire place based on a desire place data indicating the desire place. The hot spot is a place where a wireless LAN connection can be established. The desire place is a place where a user desires to access a wireless LAN. The search section outputs the searched hot spot data to the display section.

A PC card, which is connected with an information terminal device with a display section and used, for accessing a wireless local area network (LAN) includes a sending request outputting section and an output request outputting section. The sending request outputting section outputs a sending request that indicates sending a desire place data to a server. The desire place data indicates a desire place where a user desires to access a wireless LAN. The output request outputting section outputs an output request that indicates outputting a hot spot data received from the server to the display section. The hot spot data indicates a place of a hot spot in or near the desired place searched by the server based on the desire place data. The hot spot is a place where a wireless LAN connection can be established.

In the PC card of the present invention, the desire place data includes a telephone number of the desire place.

The PC card of the present invention, further includes a first memory section which stores a first table data including a relationship between a plurality of telephone numbers and a plurality of hot spots. Each of the plurality of telephone numbers corresponds to one of the plurality of hot spots. The plurality of hot spots is in or near a place corresponding to one of the plurality of telephone numbers. The search section searches the hot spot based on the first table data.

In the PC card of the present invention, the desire place data includes an address of the desire place.

The PC card of the present invention, further includes a second memory section which stores a second table data including a relationship between a plurality of addresses and a plurality of hot spots. Each of the plurality of addresses corresponds to one of the plurality of hot spots. The plurality of hot spots is in or near a place corresponding to one of the plurality of addresses. The search section searches the hot spot based on the second table data.

In the PC card of the present invention, the first table data further includes a data indicating a relationship between the plurality of telephone numbers and a plurality of maps each of which corresponds to the plurality of hot spots. Each of the plurality of telephone numbers corresponds to one of the plurality of maps. The search section outputs a signal for displaying the one of plurality of maps by the display sections.

In the PC card of the present invention, the second table data further includes a data indicating a relationship between the plurality of addresses and a plurality of maps each of which corresponds to the plurality of hot spots. Each of the plurality of addresses corresponds to one of the plurality of maps. The search section outputs a signal to be display the one of plurality of maps by the display sections.

In the PC card of the present invention, the desire place data includes an area code for a telephone number of the desire place. The search section searches an area map data indicating a map of an area which corresponds to the area code. The search section outputs a signal for displaying the area map data by the display section. The search section searches the hot spot data of the hot spot in or near a specific area which is a part of the area and selected by the user.

The PC card of the present invention, the desire place data includes a zip code for the desire place. The search section searches an area map data indicating a map of an area which corresponds to the zip code. The search section outputs a signal for displaying the area map data by the display section. The search section searches the hot spot data of the hot spot in or near a specific area which is a part of the area and selected by the user.

In the PC card of the present invention, the hot spot data includes a first map data indicating a first area containing the place of the hot spot. The search section outputs a signal for displaying one of the first map data and a second map data indicating a second area containing the first area. The search section outputs a signal for displaying places of hot spots which are in the second area except for the first area.

In the PC card of the present invention, the search section updates the hot spot data without any operation by the user.

In the PC card of the present invention, the search section outputs a signal for displaying a first hot spot and a second hot spot distinguishably, the first hot spot can be used for the user. The second hot spot can not be used for the user.

The PC card of the present invention, further includes a memory which stores a setting data that is used for accessing the wireless LAN in the hot spot and was stored when accessing the wireless LAN last time in the hot spot.

In order to achieve still another aspect of the present invention, the present invention provides a method of finding a hot spot in a desire place where a user desires to access a wireless LAN, including: searching a hot spot in or near a desire place in response to a desire place data indicating the desire place, wherein the hot spot is a place where a wireless LAN connection can be established, the desire place is a place where a user desires to access a wireless LAN; and displaying a hot spot data indicating a place of the hot spot based on a searching result.

A method of finding a hot spot in a desire place where a user desires to access a wireless LAN, including: sending a desire place data to a server, wherein the desire place data indicates a desire place where a user desires to access a wireless LAN; receiving a hot spot data from the server, wherein the hot spot data indicates a place of a hot spot in or near the desired place searched by the server based on the desire place data, the hot spot is a place where a wireless LAN connection can be established; and displaying the hot spot data.

In the method of finding a hot spot of the present invention, the desire place data includes a telephone number of the desire place.

In the method of finding a hot spot of the present invention, the step of searching the hot spot includes: searching the hot spot based on a first table data, the first table data includes a relationship between a plurality of telephone numbers and a plurality of hot spots, each of the plurality of telephone numbers corresponds to one of the plurality of hot spots, and the plurality of hot spots are in or near a place corresponding to one of the plurality of telephone numbers.

In the method of finding a hot spot of the present invention, the desire place data includes an address of the desire place.

In the method of finding a hot spot of the present invention, the step of searching the hot spot includes: searching the hot spot based on a second table data, the second table data includes a relationship between a plurality of addresses and a plurality of hot spots, each of the plurality of addresses corresponds to one of the plurality of hot spots, and the plurality of hot spots are in or near a place corresponding to one of the plurality of addresses.

In the method of finding a hot spot of the present invention, the first table data further includes a data indicating a relationship between the plurality of telephone numbers and a plurality of maps each of which corresponds to the plurality of hot spots, each of the plurality of telephone numbers corresponds to one of the plurality of maps, and the step of displaying the hot spot data displaying the one of plurality of maps.

In the method of finding a hot spot of the present invention, the second table data further includes a data indicating a relationship between the plurality of addresses and a plurality of maps each of which corresponds to the plurality of hot spots, each of the plurality of addresses corresponds to one of the plurality of maps, and the step of displaying the hot spot data displaying the one of plurality of maps.

In order to achieve still another aspect of the present invention, the present invention provides a computer program product embodied on a computer-readable medium and including code that, when executed for a method of finding a hot spot in a desire place where a user desires to access a wireless LAN, causes a computer to perform the following: searching a hot spot in or near a desire place in response to a desire place data indicating the desire place, wherein the hot spot is a place where a wireless LAN connection can be established, the desire place is a place where a user desires to access a wireless LAN; and displaying a hot spot data indicating a place of the hot spot based on a searching result.

A computer program product embodied on a computer-readable medium and including code that, when executed for a method of finding a hot spot in a desire place where a user desires to access a wireless LAN, causes a computer to perform the following: sending a desire place data to a server, wherein the desire place data indicates a desire place where a user desires to access a wireless LAN; receiving a hot spot data from the server, wherein the hot spot data indicates a place of a hot spot in or near the desired place searched by the server based on the desire place data, the hot spot is a place where a wireless LAN connection can be established; and displaying the hot spot data.

In the computer program product of the present invention, the desire place data includes a telephone number of the desire place.

In the computer program product of the present invention, the step of searching the hot spot includes: searching the hot spot based on a first table data, the first table data includes a relationship between a plurality of telephone numbers and a plurality of hot spots, each of the plurality of telephone numbers corresponds to one of the plurality of hot spots, and the plurality of hot spots are in or near a place corresponding to one of the plurality of telephone numbers.

In the computer program product of the present invention, the desire place data includes an address of the desire place.

The computer program product of the present invention, the step of searching the hot spot includes: searching the hot spot based on a second table data, the second table data includes a relationship between a plurality of addresses and a plurality of hot spots, each of the plurality of addresses corresponds to one of the plurality of hot spots, and the plurality of hot spots are in or near a place corresponding to one of the plurality of addresses.

In the computer program product of the present invention, the first table data further includes a data indicating a relationship between the plurality of telephone numbers and a plurality of maps each of which corresponds to the plurality of hot spots, each of the plurality of telephone numbers corresponds to one of the plurality of maps, and the step of displaying the hot spot data displaying the one of plurality of maps.

The computer program product of the present invention, the second table data further includes a data indicating a relationship between the plurality of addresses and a plurality of maps each of which corresponds to the plurality of hot spots, each of the plurality of addresses corresponds to one of the plurality of maps, and the step of displaying the hot spot data displaying the one of plurality of maps.

BRIEF DESCRIPTION OF THE DRAWINGS

FIGS. 7A and 7B is a view showing a flowchart of the variation operation of the first embodiment of an information terminal device according to the present invention;

FIG. 8 is a table showing another data stored in the hot spot list data memory;

FIG. 11 is a table showing another data stored in the hot spot list data memory;

FIG. 12 is a view showing another data stored in the hot spot list data memory;

FIG. 16 is a view showing another data stored in the map data memory; and

FIG. 17 is a view showing data stored in the memory of the information terminal device.

DESCRIPTION OF THE PREFERRED EMBODIMENTS

Embodiments of an information terminal device and a pc card according to the present invention will be described below with reference to the attached drawings.

(First Embodiment)

Figure 1:
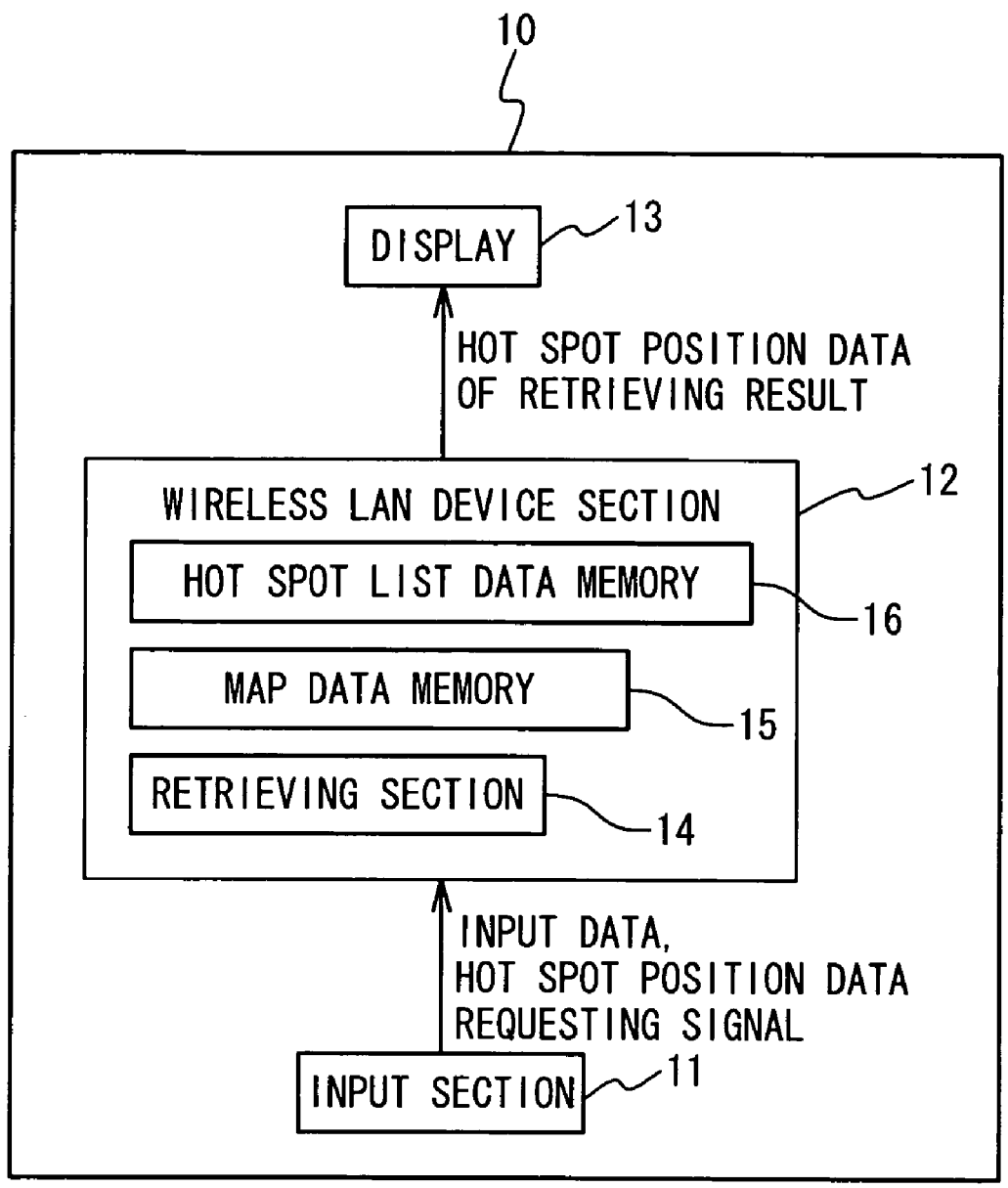
FIG. 1 is a view showing a configuration of a first embodiment of an information terminal device according to the present invention.

FIG. 1 is a view showing a configuration of a first embodiment of an information terminal device according to the present invention.

Information terminal device 10 is the portable information terminal device such as a note-type (laptop) personal computer, a PDA (personal digital assistant), a mobile telephone (cellular phone), a PHS (personal handy phone) and the like. If a user operates the information terminal device 10, the user can obtain a hot spot information desired by the user, from the information terminal device 10.

The information terminal device 10 includes an input section 11, a wireless LAN device section 12, a display 13, a Web browser (not shown) and a mail software (not shown). The wireless LAN device section 12 has a retrieving section 14, a map data memory 15 and a hot spot list data memory 16.

The input section 11 is a keyboard, a pointing device such as a mouse, or a voice input section such as a microphone. A telephone number of an area where the user desires a hot spot position data, and a signal of requesting the hot spot position data (a hot spot position data requesting signal) are inputted to the input section 11 by the user.

The wireless LAN device section 12 executes various operations in order that the information terminal device 10 is connected to the wireless LAN at a position (place) of a hot spot of a wireless LAN. The information terminal device 10 can be connected to the wireless LAN by the operation of the wireless LAN device section 12. The wireless LAN device section 12 may be a PC card that can be attached to and detached from the information terminal device 10. Also, the wireless LAN device section 12 can be the wireless LAN board fixed to the information terminal device 10.

The retrieving section 14 retrieves the hot spot position data desired by the user in response to the hot spot position data requesting signal inputted from the input section 11, by using the map data memory 15 and the hot spot list data memory 16.

The display 13 is a display composed of liquid crystals. The display 13 displays the hot spot position data retrieved by the retrieving section 14.

Figures 2, 3:
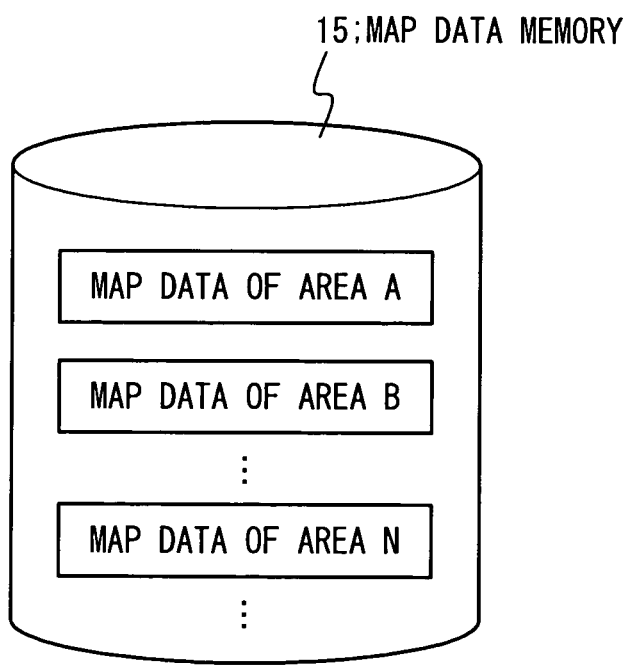
FIG. 2 is a table showing data stored in the hot spot list data memory.
FIG. 3 is a view showing data stored in the map data memory.

Telephone numbers, hot spot positions and data of areas which are related to each other are stored in the hot spot list data memory 16. FIG. 2 is a table showing data stored in the hot spot list data memory 16. As shown in FIG. 2, the hot spot position corresponding to each of the telephone numbers and the data of the corresponding area are stored in the hot spot list data memory 16.

For example, it shows that the hot spot geographically located the closest to the location (position, place) whose telephone number is 03-3123-4567 is a position a-1 in an area A. Also, it shows that the hot spots located the closest to the locations each of which telephone number is 03-3123-4568 or 03-3123-4569 are the same position a-1 in the same area A as the hot spot located the closest to the location whose telephone number is 03-3123-4567. Also, it shows that the hot spot located the closest to the location whose telephone number is 03-3123-4570 is a different position a-2 in the same area A as the hot spot located in the closest location whose telephone number is 03-3123-4567. Also, it shows that the hot spot located the closest to a location whose telephone number is 03-3123-4571 is a position b-1 in an area B different from the hot spot located the closest to the location whose telephone number is 03-313-4567.

Figure 4:
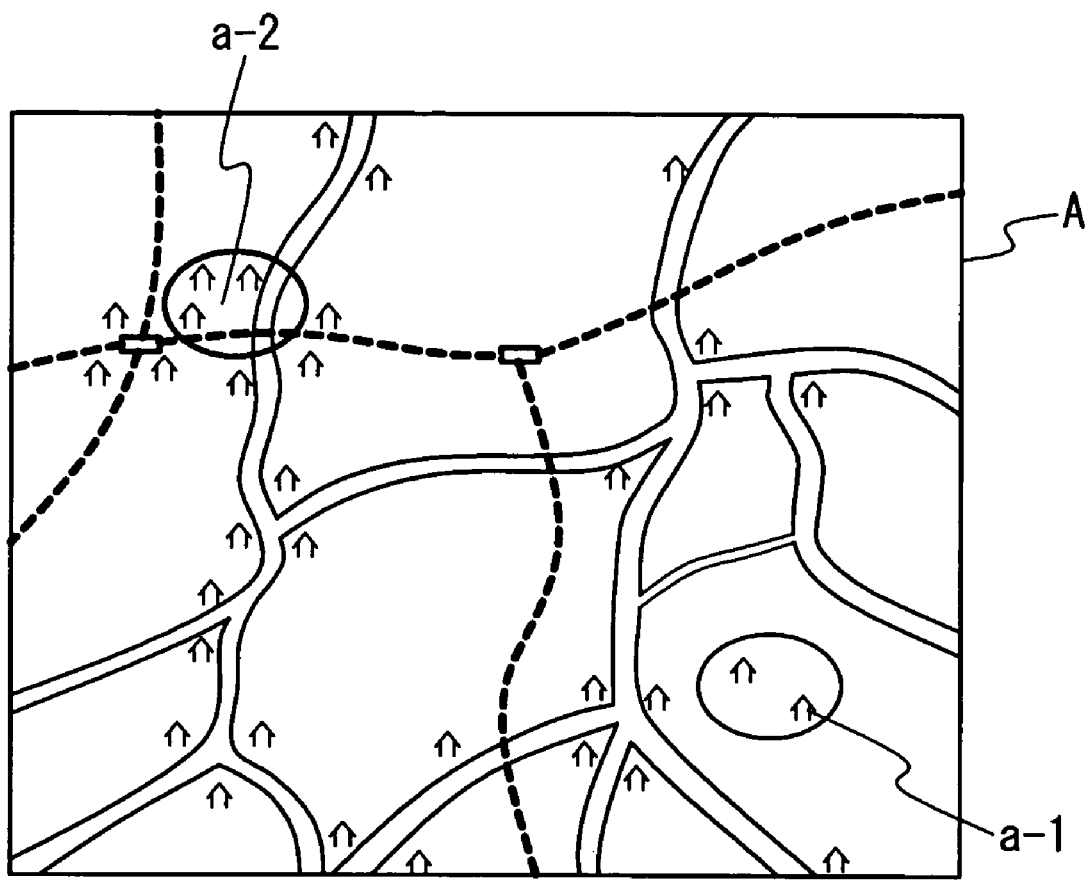
FIG. 4 is a view showing the displaying manner when the map data of the area A is displayed on the display.

FIG. 3 is a view showing data stored in the map data memory 15. The map data memory 15 stores the map data of the area A, the map data of the area B, the map data of the area N and so on. FIG. 4 is a view showing the displaying manner when the map data of the area A is displayed on the display 13. The map data of the area A contains the data of the map of the area A and the data indicative of the respective positions (territories) of the plurality of hot spots a-1, a-2 in the area A. When they are displayed on the display 13, the respective positions encircled by circles on the map of the area A correspond to the respective positions of the hot spots a-1, a-2, respectively.

Figure 5:
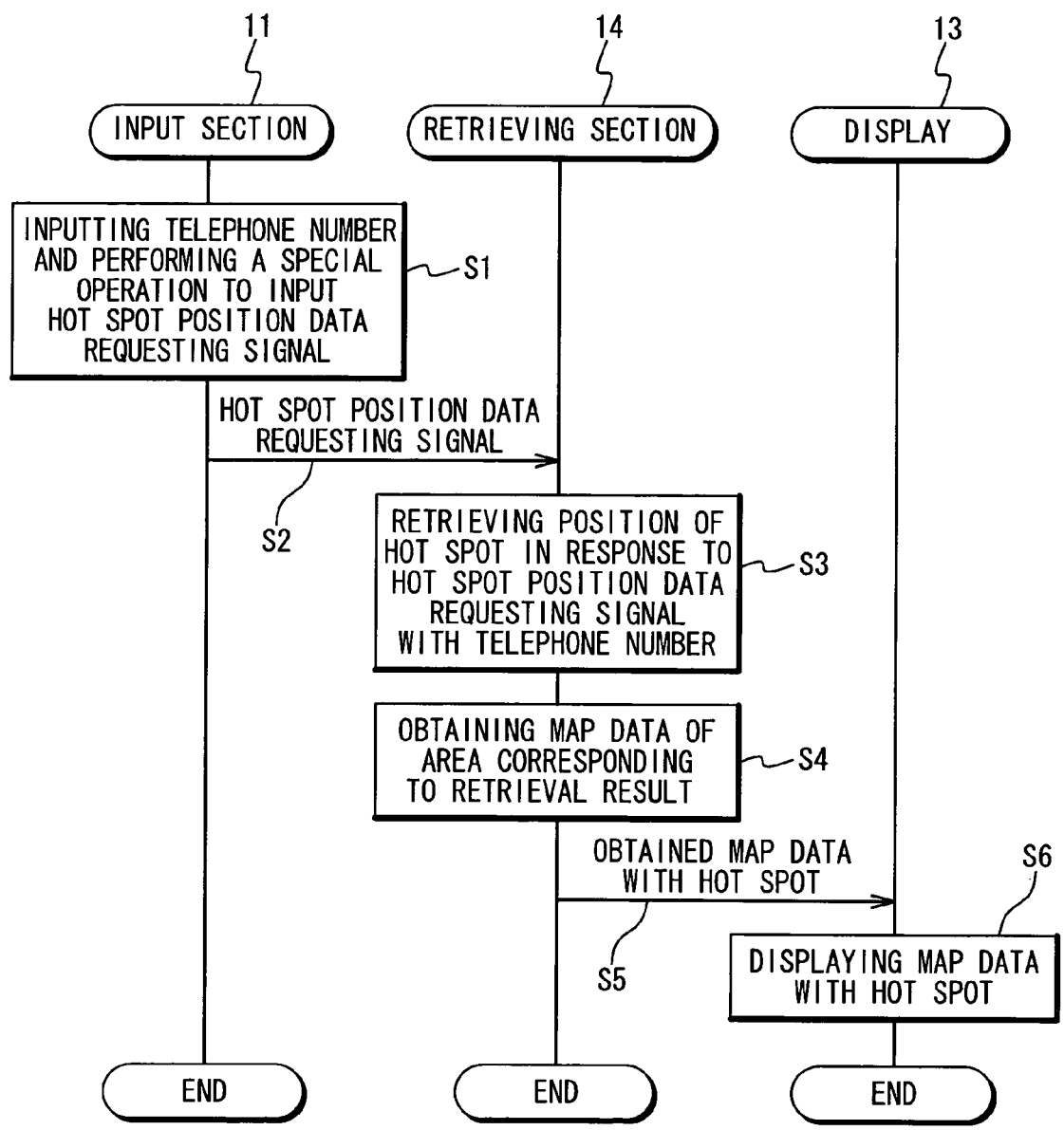
FIG. 5 is a view showing a flowchart of the operation of a first embodiment of an information terminal device according to the present invention.

FIG. 5 is a view showing a flowchart of the operation of a first embodiment of an information terminal device according to the present invention.

The user examines the telephone number of the location where the user desires to use the wireless LAN (for example, an user's destination or a currently staying location, and hereafter let us suppose that the user desires to use the wireless LAN at a position close to the location where the user currently stays). Here, let us suppose that the telephone number of the staying location of the user is 03-3123-4570. The user inputs the telephone number to the input section 11 of the information terminal device 10, and performs a special operation on the input section 11 to input the hot spot position data requesting signal from the input section 11 (step S1). The input section 11 outputs the hot spot position data requesting signal including the telephone number of 03-3123-4570 to the retrieving section 14 (step S2).

The retrieving section 14 retrieves the position of the hot spot located the closest to the location whose telephone number is 03-3123-4570, in response to the hot spot position data requesting signal inputted from the input section 11. The retrieving section 14 carries out the retrieval by referring to the hot spot list data memory 16, and obtains the data indicating that the position of the hot spot located the closest to the location of 03-3123-4570 is the position a-2 in the area A, as the retrieval result (step S3). Based on the retrieval result, the retrieving section 14 refers to the map data memory 15 and obtains the map data of the area A corresponding to the retrieval result (step S4). The retrieving section 14 outputs the obtained map data of the area A and the data indicating that the position a-2 of the hot spot in the area A is the closest position with regard to the request of the user, to the display 13 (step S5).

The display 13 displays the map data of the area A inputted from the retrieving section 14, represents a round mark indicative of the hot spot position a-2 on the map of the area A by using a first color (such as red). Also, the display 13 represents a round mark indicative of a hot spot position (the hot spot position a-1 in this example) other than the hot spot position a-2 in the area A by using a second color (such as black) (step S6). Consequently, the user can know the hot spot position a-2 of the position located the closest to the currently staying position on the map of the area A including the currently staying position by viewing the display 13. Also, the user can know the hot spot position a-1 located at a different location in the same area A. The user can access and use the wireless LAN by moving to the position a-2 of the first color displayed on the display 13 and then using the wireless LAN device section 12.

When desiring to use the wireless LAN, the user inputs the telephone number to the information terminal device 10. The wireless LAN device section 12 retrieves the area on the basis of the telephone number and displays the list of the positions of the hot spots at the corresponding location.

Even if the user does not know the location of the hot spot, the user can visually know the location of the hot spot of the wireless LAN. Thus, the user is able to easily use the wireless LAN. Also, it is easy for the user to use the wireless LAN at the unknown location.

A variation of the first embodiment will be described below with reference to the drawings.

Figure 6:
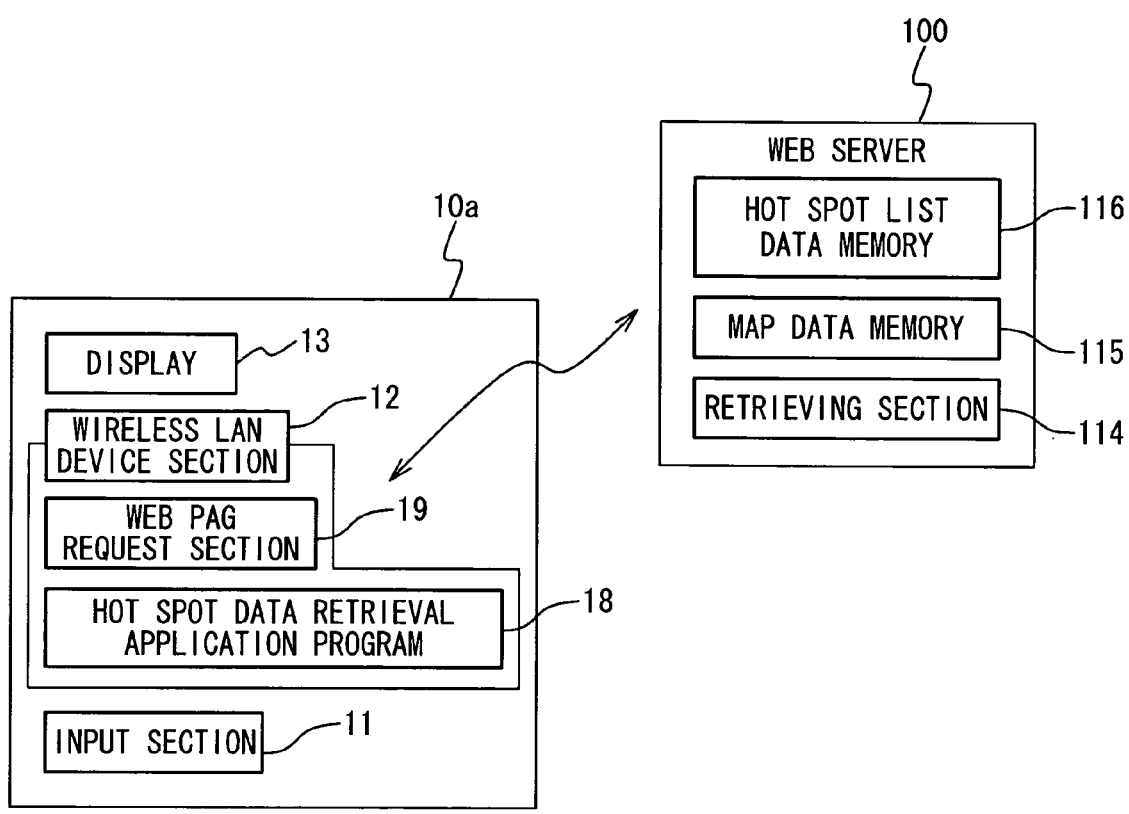
FIG. 6 is a view showing a configuration of the variation of the first embodiment of an information terminal device according to the present invention.

FIG. 6 is a view showing a configuration of the variation of the first embodiment of an information terminal device according to the present invention.

Information terminal device 10a includes an input section 11, a wireless LAN device section 12 and a display 13. The wireless LAN device section 12 of the information terminal device 10a includes a hot spot data retrieval application program 18 and a Web page request section 19.

The wireless LAN device section 12 is equal to the first embodiment in that it executes the various operations in which the information terminal device 10a is connected to the wireless LAN at the position of the hot spot of the wireless LAN. The wireless LAN device section 12 may be configured in the PC card and the wireless LAN board, equal to those of the information terminal device 10. The input section 11 and the display 13 of the information terminal device 10a are equal to those of the information terminal device 10.

A Web server 100 includes a retrieving section 114, a map data memory 115 and a hot spot list data memory 116. The data stored in the map data memory 115 and the hot spot list data memory 116 are equal to the data stored in the map data memory 15 and the hot spot list data memory 16 in the first embodiment, respectively. The retrieving section 114 is equal to the retrieving section 14.

FIGS. 7A and 7B are a view showing a flowchart of the variation operation of the first embodiment of an information terminal device according to the present invention.

The user inputs the hot spot position data requesting signal from the input section 11 (step S11). The input section 11 outputs the hot spot position data requesting signal to the hot spot data retrieval application program 18 (step S12). The hot spot data retrieval application program 18 starts in response to the hot spot position data requesting signal (step S13). Next, the user inputs the telephone number of the location where the user desires to use the wireless LAN, from the input section 11 (step S14). The input section 11 outputs the telephone number to the hot spot data retrieval application program 18 (step S15). The data of the telephone number is processed to be combined with the hot spot position data requesting signal by the hot spot data retrieval application program 18 (step S16). The hot spot data retrieval application program 18 outputs the hot spot position data requesting signal to the Web page request section 9 (step S17). The hot spot position data requesting signal is processed to be a Web data request signal indicative of the request of the Web data of the hot spot position data corresponding to the input telephone number, by the Web page request section 9 (step S18). The Web page request section 9 outputs the Web data request signal through the Internet to the Web server 100 (step S19).

Here, the communication between the Web server 100 and the information terminal device 10a through the Internet is carried out before the detection of the hot spot located close to the location where the user desires to use the wireless LAN. Therefore, it is done through a wireless or a wire communication at the hot spot at a currently staying location different from the location where the user desires to use the wireless LAN.

The retrieving section 114 performs the same retrieval as the retrieving section 14 based on the Web data request signal. The retrieving section 114 carries out the retrieval by referring to the hot spot list data memory 116 and the telephone number contained in the Web data request signal received from the Web page request section 19. The retrieving section 114 obtains the data indicating the position of the hot spot located the closest to the location of the telephone number (step S20). Based on the retrieval result, the retrieving section 114 refers to the map data memory 115 and obtains the map data of the area corresponding to the retrieval result (step S21). The retrieving section 114 generates the map data as a Web data (step S22) and transmits the web data to the Web page request section 19 of the information terminal device 10a (step S23). The Web page request section 19 receives the Web data indicative of the retrieval result from the Web server 100. The Web page request section 19 outputs the Web data to the display 13 (step S24). Consequently, the same indication as the display 13 of the information terminal device 10 in the first embodiment is done on the display 13 (step S25).

Here, the variation of the first embodiment has been described. However, for the other respective embodiments that will be described below, the variation using the Internet and the Web server 100 can be employed similarly to the variation of the first embodiment.

(Second Embodiment)

In the case of the first embodiment, if the user does not know the telephone number, the hot spot position can not be retrieved. In case of the second embodiment, a range of a map to be firstly displayed on the display 13 is changed depending on a range of the telephone number inputted by the user. If the user inputs only an area code to the information terminal device 10, a map of an area of the area code is displayed on the display 13. The area which the user itself desires to use is requested to be selected from the map of the area of the area code displayed on the display 13. This embodiment enables the provision of the position data of the hot spot of the area which the user desires to use. Also, similarly to the first embodiment, the request of the input of the area code enables the detailed map to be displayed from the first time by using the table of FIG. 2.

The second embodiment employs the configuration of the information terminal device 10 shown in FIG. 1. In addition to the table shown in FIG. 2, a table shown in FIG. 8 is added to the hot spot list data memory 16 of the information terminal device 10 in the second embodiment. FIG. 8 is a table showing another data stored in the hot spot list data memory 16.

Figure 9:
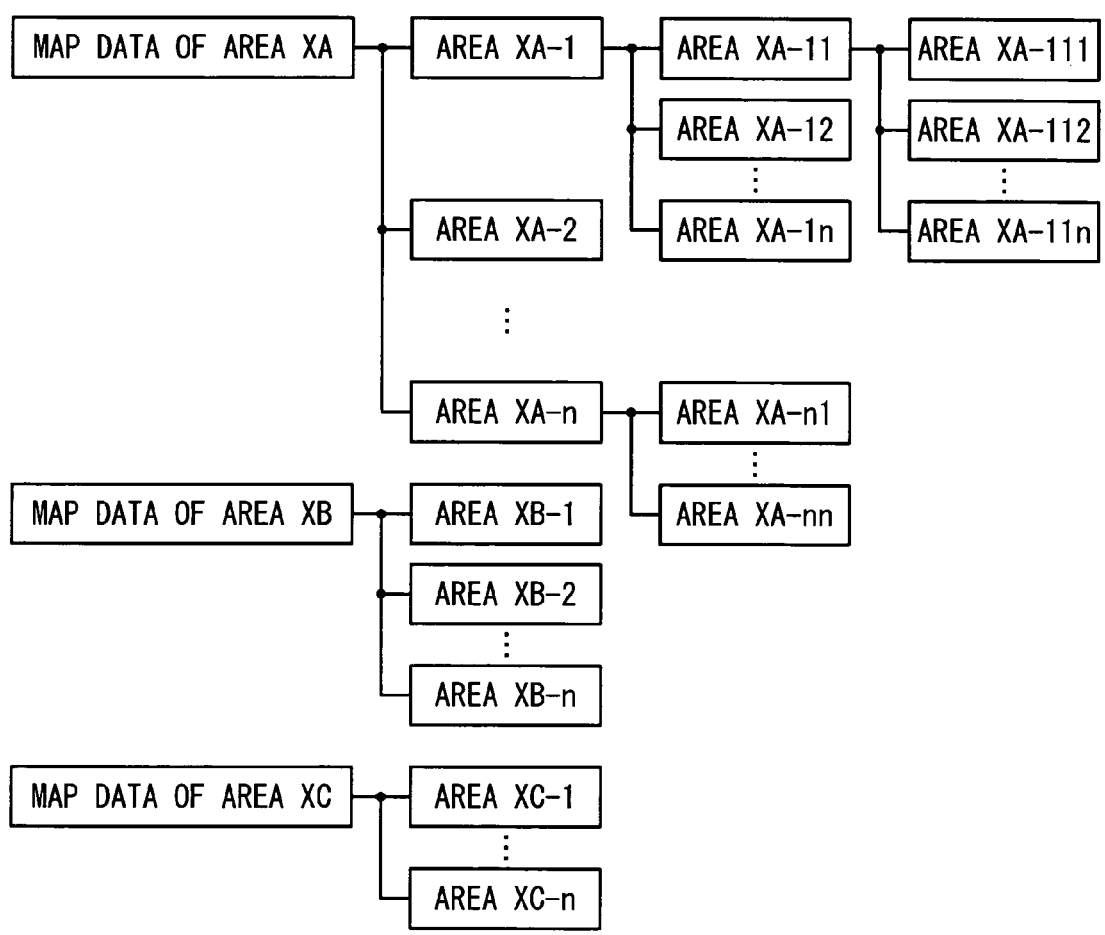
FIG. 9 is a view showing another data stored in the map data memory.

An area code and an area corresponding to the area code are indicated on the table in FIG. 8. In addition to the map data of the areas A, B . . . N shown in FIG. 3, a map data shown in FIG. 9 is added to the map data memory 15 of the information terminal device 10 in the second embodiment. FIG. 9 is a view showing another data stored in the map data memory 15.

As shown in FIG. 9, the map data memory 15 includes the map data of areas XA, XB, XC . . . corresponding to the respective area codes. Hereafter, areas XA-1 to XA-n corresponding to the map data of the area A are described. However, the areas XB, XC . . . other than the area XA are similar.

The map data memory 15 stores: the respective map data of a plurality of first areas XA-1, XA-2 . . . XA-n after the area XA is divided into a plurality of segments; the respective map data of a plurality of second areas XA-11, XA-12, . . . XA-1n after the first area XA-1 is divided into a plurality of segments; and the respective map information of a plurality of third areas XA-111, XA-112, . . . XA-11n after the second area XA-11 is divided into a plurality of segments.

Each of the maps of the first areas XA-1, XA-2, . . . XA-n is prepared by increasing a scale of a part of the area XA. Each of the maps of the second areas XA-11, XA-12, . . . XA-1n is prepared by increasing a scale of a part of the first area XA-1. Each of the maps of the third areas XA-111, XA-112, . . . XA-11n is prepared by increasing a scale of a part of the second area XA-11.

Here, the explanations until the third area are done. Similarly, low order layers can be included such as fourth, fifth, sixth, . . . areas. Also, here, the explanations about the first area XA-1 and the second area XA-11 are done respectively. However, a first area other than the first area XA-1 and a second area other than the second area XA-11 can be done similarly.

The areas of the lowest layer in FIG. 9 correspond to the areas A, B, . . . N shown in FIGS. 2, 3. That is, if the lowest layer of FIG. 9 is, for example, the third layer (the areas XA-111, XA-112, . . . XA-11n), the areas XA-111, XA-112, . . . XA-11n correspond to the areas A, B, . . . N shown in FIGS. 2, 3, respectively.

The respective map data shown in FIG. 9 include the data indicative of the respective positions of the plurality of hot spots included in the areas of the map, which is the same as that of the first embodiment.

Figure 10A:
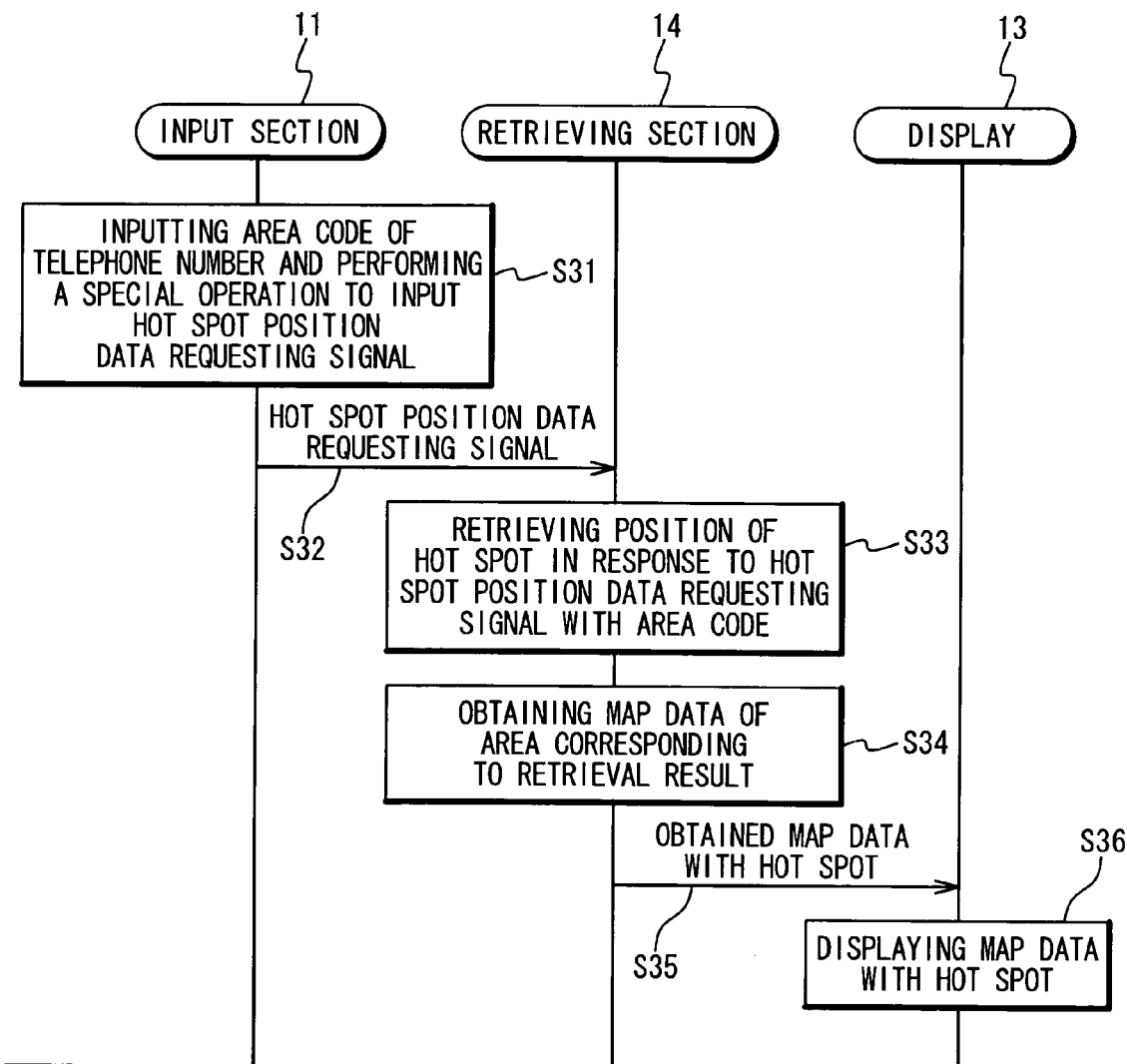
FIGS. 10A and 10B is a view showing a flowchart of an operation of the second embodiment of an information terminal device according to the present invention.
Figure 10B:
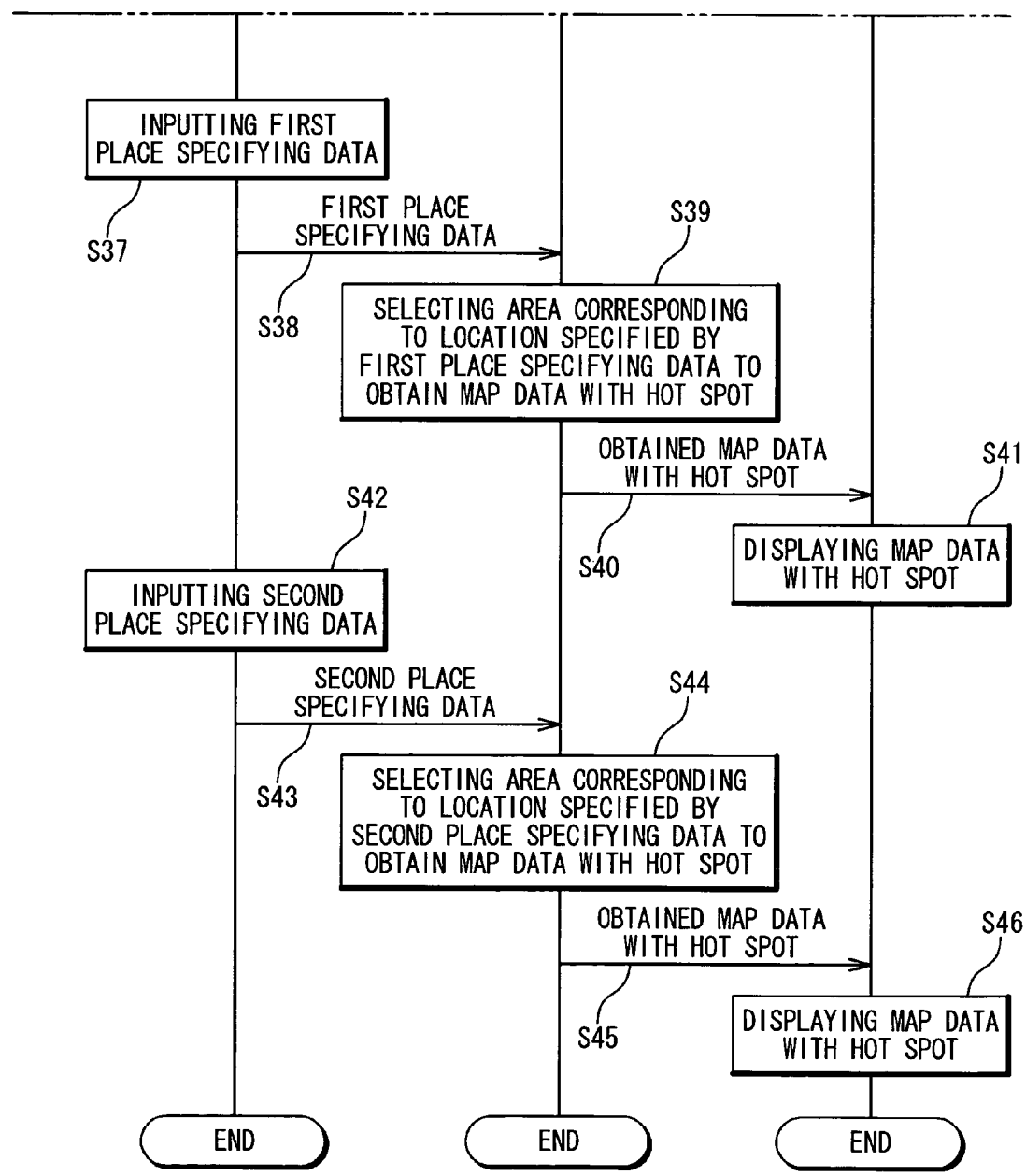

FIGS. 10A and 10B are a view showing a flowchart of an operation of the second embodiment of an information terminal device according to the present invention.

Let us suppose that the user knows only the area code with regard to the telephone number of the location where the user desires to use the wireless LAN. Here, the area code of the telephone number of the location where the user desires to use the wireless LAN is assumed to be 045. The user inputs the area code of the telephone number from the input section 11 of the information terminal device 10, and also performs the special operation on the input section 11 to input the hot spot position data requesting signal from the input section 11 (step S31). The input section 11 outputs the hot spot position data requesting signal including the area code of 045 to the retrieving section 14 (step S32).

The retrieving section 14 retrieves the area corresponding to the area code of 045, in response to the hot spot position data requesting signal inputted from the input section 11. The retrieving section 14 carries out the retrieval by referring to the table of FIG. 8 of the hot spot list data memory 16. When the retrieving section 14 obtains the data indicating that the corresponding area of the area code is a area XB (Yokohama City) (step S33), it obtains the map data of the area XB from the map data memory 15 (step S34), and outputs the map data to the display 13 (step S35). The display 13 displays thereon the map data of the area XB (step S36). The map data displayed on the display 13 contains the indication of positions of hot spots inside Yokohama City. The user views the indication on the display 13 and inputs from the input section 11 the data (the first place specifying data) to specify the location (place, position) where the user desires to use the wireless LAN from the map displayed on the display 13 (step S37). In this case, the user operates the mouse, the keyboard and the like of the input section 11 and inputs the first place specifying data from the input section 11.

The first place specifying data is sent from the input section 11 to the retrieving section 14 (step S38). The retrieving section 14 selects the area corresponding to the location specified by the first place specifying data, from the plurality of first areas XB-1, XB-21, . . . XB-n, and obtains the map data of the area (that is assumed to be XB-2, in this case) from the map data memory 15 (step S39). The retrieving section 14 outputs the obtained map data of the first area XB-2 to the display 13 (step S40). The display 13 displays thereon the map data of the first area XB-2 (step S41). The map information displayed on the display 13 contains the indication of the positions of the hot spots in the first area XB-2. In this case, the hot spot position located the closest to the location specified by the first place specifying data is represented by the first color, and the hot spot positions other than it inside the first area XB-2 are represented by the second color. The user views the indication on the display 13, and inputs from the input section 11 the data (the second place specifying data) to specify the location (place, position) where the user desires to use the wireless LAN from the map (the first area XB-2) displayed on the display 13 (step S42). Also in this case, the user similarly operates the mouse, the keyboard and the like of the input section 11, and inputs the second place specifying data from the input section 11 (the inputting methods of the subsequent third, fourth, . . . place specifying data are same).

The second place specifying data is sent from the input section 11 to the retrieving section 14 (step S43). The retrieving section 14 selects the area corresponding to the location specified by the second place specifying data, from a plurality of second territories XB-21, XB-22, . . . XB-2n, and obtains the map data of the area (that is assumed to be XB-21, in this case) from the map data memory 15 (step S44). The retrieving section 14 outputs the obtained map data of the second area XB-21 to the display 13 (step S45). The display 13 displays the map data of the second area XB-21 (step S46). The map data displayed on the display 13 contains the indication of the positions of the hot spots in the second area XB-21. In this case, the hot spot position located the closest to the location specified by the second place specifying data is represented by the first color, and the hot spot positions other than it inside the second area XB-21 are represented by the second color. The user views the indication on the display 13, and inputs from the input section 11 the data (the third place specifying data) to specify the location where the user desires to use the wireless LAN from the map (the second area XB-21) displayed on the display 13. Also here, the specifying methods until the second area have been explained. However, the specifying methods of the third, fourth, . . . areas are similarly done.

Even if the user does not know even the area code of the telephone number of the location where the user desires to use the wireless LAN, the user can finally know the hot spot position of the area where the user desires to use the wireless LAN, by gradually narrowing down to the narrow range map from the wide range map corresponding to the area code. The user can use the wireless LAN by moving to the position and then using the wireless LAN device section 12.

(Third Embodiment)

In the case of the first embodiment, if the user does not know the telephone number, the user can not retrieve the hot spot position. So, this is designed such that the position data retrieval of the hot spot can be done not only from the telephone number but also from a zip code and an address. Consequently, the user can carry out the retrieval service from the data that can be known by the user itself. Thus, the user can receive the service even if the user does not know the telephone number.

The third embodiment employs the configuration of the information terminal device 10 shown in FIG. 2. Respective tables shown in FIGS. 11 and 12 are further added to the hot spot list data memory 16 of the information terminal device 10 in the third embodiment. FIG. 11 is a table showing another data stored in the hot spot list data memory 16. The table of FIG. 11 stores addresses, the positions of the hot spots located the closest to the address, and the data of the areas of the hot spots. They are related to each other. FIG. 12 is a view showing another data stored in the hot spot list data memory 16. The table of FIG. 12 stores zip codes and the data of the areas each of which corresponds to one of the zip codes.

As shown in FIG. 12 and FIG. 9, the respective zip codes correspond to the second area shown in FIG. 9. In FIG. 12, it is assumed such that the area corresponding to the respective zip codes corresponds to the second area shown in FIG. 9. However, it is possible to set an independent area that is not equal to the area in any hierarchy shown in FIG. 9 and to employ the configuration in which the data of the area is stored in the map data memory 15.

Figure 13A:
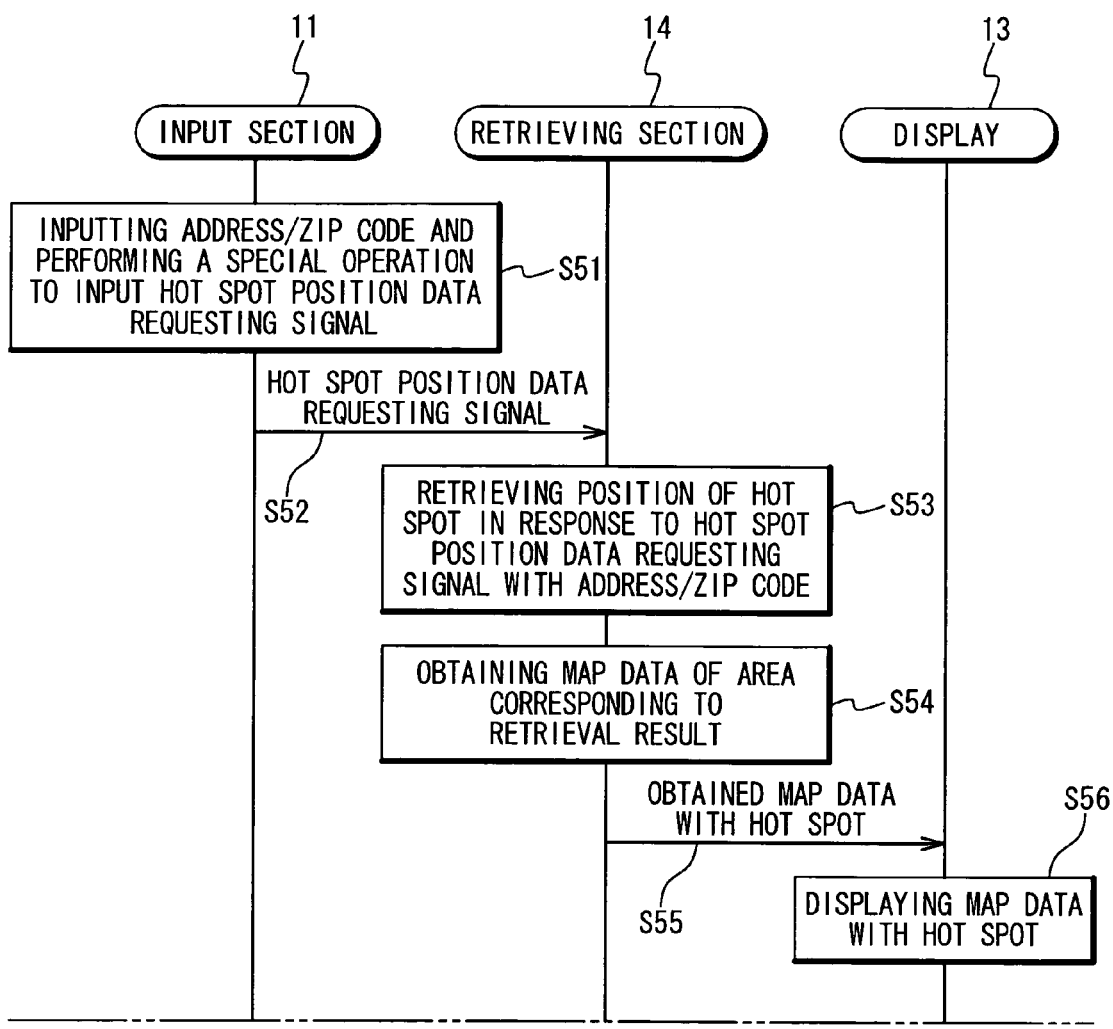
FIGS. 13A and 13B is a view showing a flowchart of an operation of the third embodiment of an information terminal device according to the present invention.
Figure 13B:
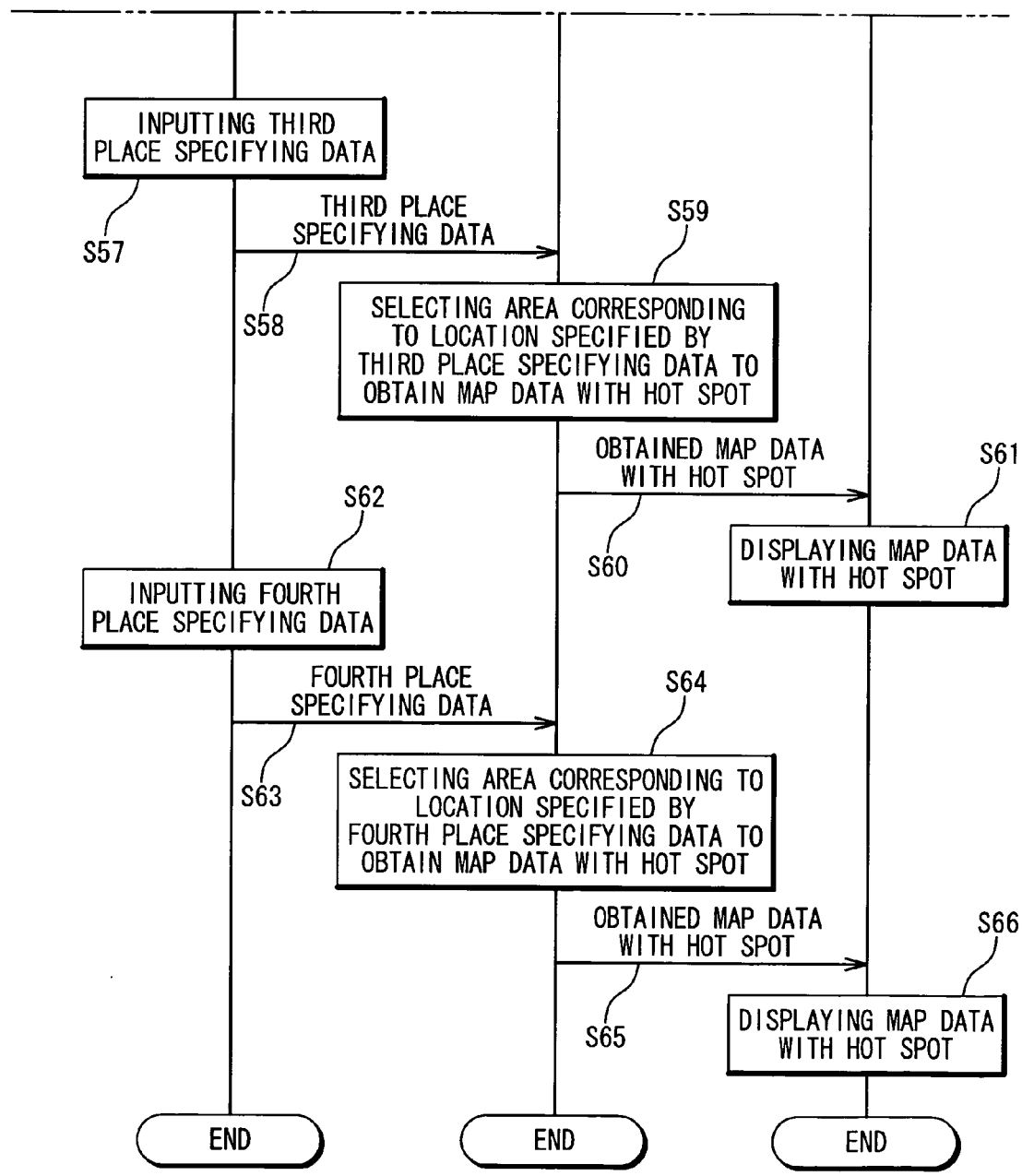

FIGS. 13A and 13B are a view showing a flowchart of an operation of the third embodiment of an information terminal device according to the present invention.

The user examines the address of the location (place, position) where the user desires to use the wireless LAN. Here, the address is assumed to be XX-Town, Shinagawa-ku Tokyo. The user inputs the address from the input section 11 of the information terminal device 10, and also performs the special operation on the input section 11 to input the hot spot position data requesting signal from the input section 11 (step S51). The input section 11 outputs the hot spot position data requesting signal including the address of XX-Town, Shinagawa-ku, Tokyo to the retrieving section 14 (step S52).

The retrieving section 14 retrieves the position of the hot spot located the closest to the location of XX-Town, Shinagawa-ku, Tokyo, in response to the hot spot position data requesting signal inputted from the input section 11. The retrieving section 14 carries out the retrieval by referring to the hot spot list data memory 16. The retrieving section 14 obtains the data indicating that the position of the hot spot located the closest to the location of XX-Town, Shinagawa-ku, Tokyo is the position b-2 in the area B, as the retrieval result (step S53). The retrieving section 14 refers to the map data memory 15 on the basis of the retrieval result and obtains the map data of the area B corresponding to the retrieval result (step S54). The retrieving section 14 outputs the obtained map data of the area B and the data indicating that the position b-2 of the hot spot in the area B is the closest position for the request of the user, to the display 13 (step 55).

The display 13 displays the map data of the area B received from the retrieving section 14 (step S56). The display 13 represents a round mark indicative of the hot spot position b-2 on the map of the area B by using the first color (such as red). The display 13 also represents a round mark indicative of a hot spot position (the hot spot position b-1 in this example) other than the hot spot position a-2 in the same area B by using the second color (such as black). Consequently, the user can know the hot spot position b-2 of the position located the closest to the location where the user desires to use the wireless LAN, on the map of the area B, by viewing the display 13. Also the user can know the hot spot position b-1 located at a different location in the same area B. The user can use the wireless LAN by moving to the position b-2 of the first color displayed on the display 13 and then using the wireless LAN device section 12. The steps S57 to S66 is not processed in this case.

Let us suppose that the user knows only the zip code of the location where the user desires to use the wireless LAN. Here, the zip code of the location where the user desires to use the wireless LAN is assumed to be 171-0001. The user inputs the zip code from the input section 11 of the information terminal device 10, and also performs the special operation on the input section 11 to inputs the hot spot position data requesting signal from the input section 11 (step 51). The input section 11 outputs the hot spot position data requesting signal including the zip code of 171-0001 to the retrieving section 14 (step S52).

The retrieving section 14 retrieves the area corresponding to 171-0001 in response to the hot spot position data requesting signal inputted from the input section 11. The retrieving section 14 carries out the retrieval by referring to the table of FIG. 12 of the hot spot list data memory 16. The retrieving section 14 obtains the data indicating that the corresponding area of the zip code related to the request is a area XA-11, as the retrieval result (step S53). The retrieving section 14 obtains the map data of the area XA-11 from the map data memory 15 based on the retrieval result (step S54). The retrieving section 14 outputs the map data to the display 13 (step S55). The display 13 displays thereon the map data of the area XA-11 (step S56). The map data displayed on the display 13 contains the indication of positions of hot spots in the area XA-11. The user views the indication on the display 13 and inputs from the input section 11 the data (the third place specifying data) to specify the location (place, position) where the user desires to use the wireless LAN from the map displayed on the display 13 (step S57). In this case, the user operates the mouse, the keyboard and the like of the input section 11 and inputs the third place specifying data from the input section 11.

The third place specifying data is sent from the input section 11 to the retrieving section 14 (step S58). The retrieving section 14 selects the area corresponding to the location specified by the third place specifying data, from a plurality of third areas XB-111, XB-112, . . . XB-11n, and obtains the map data of the area (that is assumed to be XB-112, in this case) from the map data memory 15 (step S59). The retrieving section 14 outputs the obtained map data of the third area XB-112 to the display 13 (step S60). The display 13 displays thereon the map data of the third territory XB-112 (step S61). The map data displayed on the display 13 contains the indication of the positions of the hot spots in the third area XB-112. In this case, the hot spot position located the closest to the location specified by the third place specifying data is represented by the first color, and the hot spot positions other than it inside the third area XB-112 are represented by the second color. The user views the indication on the display 13, and inputs from the input section 11 the data (the fourth place specifying data) to specify the location (place, position) where the user desires to use the wireless LAN from the map (the third area XB-112) displayed on the display 13 (step S62).

The fourth place specifying data is sent from the input section 11 to the retrieving section 14 (step S63). The retrieving section 14 selects the area corresponding to the location specified by the fourth place specifying data, from a plurality of fourth areas XB-1121, XB-1122, . . . XB-112n, and obtains the map data of the area (that is assumed to be XB-1121, in this case) from the map data memory 15 (step S64). The retrieving section 14 outputs the obtained map data of the fourth area XB-1121 to the display 13 (step s65). The display 13 displays the map data of the fourth area XB-1121 (step S66). The map data displayed on the display 13 contains the indication of the positions of the hot spots in the fourth area XB-1121. In this case, the hot spot position located the closest to the location specified by the fourth place specifying data is represented by the first color, and the hot spot positions other than it inside the fourth area XB-1121 are represented by the second color. Here, the specifying methods until the fourth area have been explained. However, the specifying methods of the fifth, sixth, areas are similarly done.

Even if the user does not know even the address of the location where the user desires to use the wireless LAN, the user can finally know the hot spot position of the area where the user desires to use the wireless LAN, by gradually narrowing down to the narrow range map from the wide range map corresponding to the zip code. The user can use the wireless LAN by moving to the position and then using the wireless LAN device section 12.

According to the third embodiment, the user can carry out the retrieval service from the data (the address or the zip code) that can be known by the user itself. Thus, even if the user does not know the detailed telephone number of an actual field, the user can refer to the map of the hot spot.

(Fourth Embodiment)

In the above-mentioned embodiments, in the case when the map information are prepared for each of the plurality of hierarchically set territories as shown in FIG. 9 and when the position data of the hot spot only in the single area retrieved on the basis of the telephone number, the address and the zip code, which are inputted by the user, is displayed on the display 13, there may be a possibility that the location where the user desires to use the wireless LAN is located near the boundary between the plurality of areas. In this case, there may be a possibility that a hot spot of a area adjacent to the area is closer to the location, where the user desires to use the wireless LAN, than the area including the location where the user desires to use the wireless LAN.

This is concretely explained. Let us suppose the following condition. That is, the retrieving section 14 carries out the retrieval, on the basis of the telephone number (including only the area code or including even a local exchange number in addition thereto), the zip code or the address of the location which is inputted to the input section 11 and at which the user desires to use the wireless LAN. As the retrieval result, the map data of the area XA-111 (including the data of the position of the hot spot located the closest to the location where the user desires to use the wireless LAN inside the territory XA-111) is displayed on the display 13.

Here, this includes both of the case that on the basis of a telephone number containing even a local exchange number or an address, as the result when the retrieving section 14 retrieves the area corresponding to the telephone number or the address, the map data of the area XA-111 is displayed on the display 13 from the beginning, and the case that on the basis of the telephone number up to the area code or the zip code, as the result when the retrieving section 14 retrieves the territory corresponding to the telephone number or the zip code, the area in the higher order hierarchy than the area XA-111 is firstly selected, and then the map data of the area XA-111 is displayed on the display 13 as the result when the user inputs the place specifying data.

In both of the above-mentioned cases, the location where the user desires to use the wireless LAN is included in the area XA-111. Here, the position of the hot spot located the closest to the location where the user desires to use the wireless LAN inside the area XA-111 displayed on the display 13 is not always limited to the position of the hot spot located the closest to the location where the user desires to use the wireless LAN. If the location where the user desires to use the wireless LAN is located near the boundary portion of the area XA-111 (the boundary between a different area and it) including the location where the user desires to use the wireless LAN, there may be a case that the hot spot inside an area (for example, a area XA-112) adjacent to the area XA-111 is located the closest to the location where the user desires to use the wireless LAN.

So, in the fourth embodiment, if the map data of a certain area is displayed on the display 13, the user operates the input section 11, which enables the map data of the displayed area and the higher order area including the area adjacent to the area to be displayed on the display 13. In this case, the user can check the position of the hot spot located the truly closest to the location where the user desires to use the wireless LAN, by viewing the position of the hot spot included in the map data of the high order area displayed on the display 13.

Figure 14:
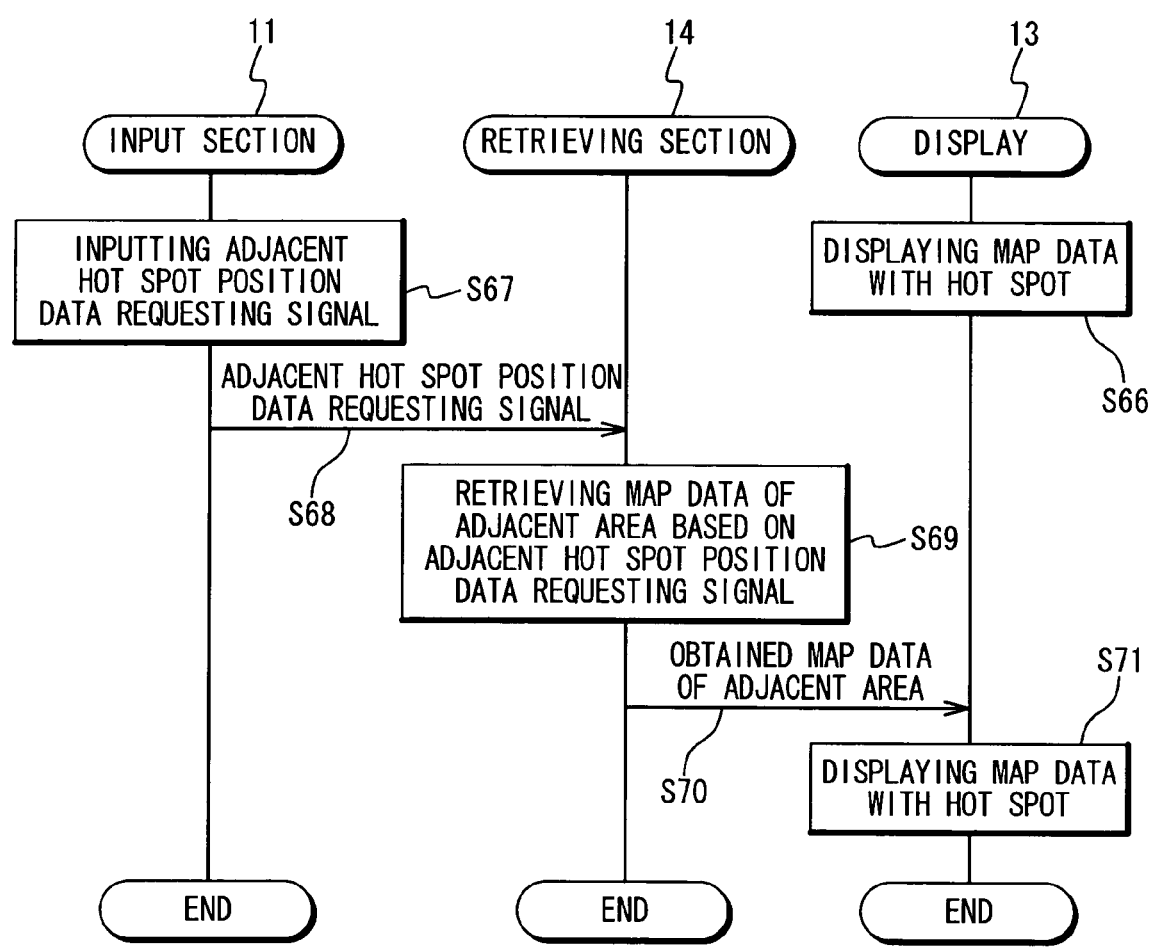
FIG. 14 is a view showing a flowchart of an operation of the fourth embodiment of an information terminal device according to the present invention.

FIG. 14 is a view showing a flowchart of an operation of the fourth embodiment of an information terminal device according to the present invention. This flowchart is a sequel to the flowchart if FIG. 13B (steps S51 to S66).

For example, when the map data of the area XA-111 is displayed on the display 13 (step S66, not shown in FIG. 14), the user performs the special operation on the input section 11 to input the adjacent hot spot position data requesting signal from the input section 11 (step S67). The input section 11 outputs the adjacent hot spot position data requesting signal including the data of the area XA-111 to the retrieving section 14 (step S68). The retrieving section 14 retrieves carries out the retrieval by referring to the map data memory 15 on the basis of the data of the area XA-111 and obtains the map data of the area adjacent to the area XA-111 (step S69). The retrieving section 14 outputs the obtained map data of the area adjacent to the area XA-111 including the position of the hot spot in the area, to the display 13 (step 70). The display 13 displays the map data of the area adjacent to the area XA-111 received from the retrieving section 14 (step S71). The user can display the map data (including the data of the positions of the hot spots in the area XA-11) of the territory XA-11 including even the areas XA-112 to XA-11n, which are adjacent to the territory XA-111, and thereby confirm the position of the hot spot located the closest to the location where the user desires to use the wireless LAN.

In this case, after the location where the user desires to use the wireless LAN is specified in the information terminal device 10 (specified by the input of the telephone number or the address or the input of the place specifying data), when the user operates the input section 11 and displays on the display 13 the map data of the area (XA-11) including the areas (XA-112 to XA-11n) adjacent to the area (XA-111) including the location where the user desires to use the wireless LAN, the position of the hot spot located the closest to the location where the user desires to use the wireless LAN can be automatically retrieved from inside the wide area (XA-11) displayed on the display 13, and the area result can be displayed on the map data of the display 13. In this case, in the information terminal device 10, the distance between the positions of the respective hot spots inside the area (XA-11) and the location where the user desires to use the wireless LAN is determined on the map data of the area (XA-11) displayed on the display 13. Then, the location of the shortest distance can be detected as the position of the closest hot spot.

(Fifth Embodiment)

There may be a case that with time, the number of the hot spots in the wireless LAN is increased or decreased and the position is changed. In this case, as shown in FIG. 6, when the position data of the hot spots are collectedly managed by the hot spot list data memory 16 and the map data memory 15 in the Web server 100, the data of the hot spot list data memory 16 and the map data memory 15 may be updated on demand.

On the contrary, when the map data memory 15 and the hot spot list data memory 16 in the wireless LAN device section 12 have the data of the positions of the hot spots, if it is not updated, the data becomes old and of no use. So, by using the following method, the newest hot spot list can be provided to the map data memory 15 and the hot spot list data memory 16 in the wireless LAN device section 12 of the information terminal device 10.

Figure 15:
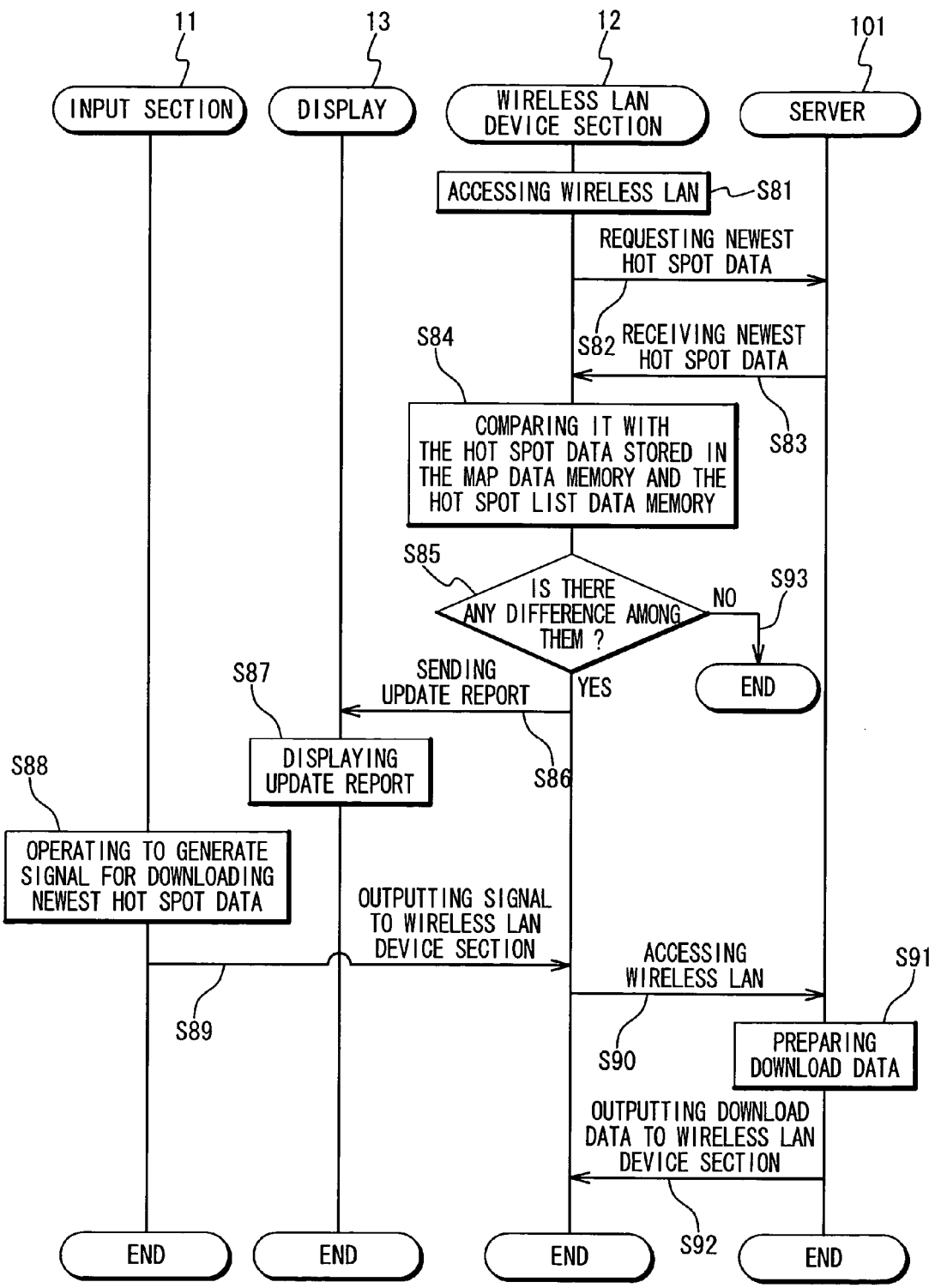
FIG. 15 is a view showing a flowchart of an operation of the fifth embodiment of an information terminal device according to the present invention.

FIG. 15 is a view showing a flowchart of an operation of the fifth embodiment of an information terminal device according to the present invention.

The position list data of the newest hot spot is always registered in the server 101 of the wireless LAN. The server of the wireless LAN may be the Web server (not shown). The wireless LAN device section 12 of the information terminal device 10, when accessing the wireless LAN (step S81), requests the newest hot spot data stored in the server of the wireless LAN (step S82). It may be the version of the newest hot spot data. Then, the wireless LAN device section 12 receives the newest hot spot data at that time point (step S83), and compares it with the hot spot data stored in the map data memory 15 and the hot spot list data memory 16 (step S84). Then, as the compared result, if there is a difference among them (step S85, Yes), the wireless LAN device section 12 judges that there is the newest data (the data that is not updated). In this case, the wireless LAN device section 12 sends an update report through the display 13 to the user (step S86). The display 13 displays the update report (step S87).

The user receiving the update report operates the input section 11 to generate a signal that the wireless LAN device section 12 accesses the wireless LAN and downloads the newest hot spot data from the server 101 of the wireless LAN to the map data memory 15 and the hot spot list data memory 16 (step S88).

The signal from the input section 11 is sent to the wireless LAN device section 12 (step S89). The wireless LAN device section 12 accesses the wireless LAN and requests for downloading the newest hot spot data from the server 101 (step S90). The server 101 prepares the download data (step S91), and sends (outputs) it to the wireless LAN device section 12 (step S92). The wireless LAN device section 12 stores the download data (the newest hot spot data) in the map data memory 15 and the hot spot list data memory 16. If there is not a difference between among them (step S85, No), the process is ended.

Also, if the wireless LAN device section 12 judges that there is the newest data, when the wireless LAN device section 12 accesses the wireless LAN, it is possible to employ the method of automatically downloading from the server of the wireless LAN.

If the hot spot data stored in the hot spot list data memory 16 is compared with the newest hot spot information stored in the server of the wireless LAN, it is possible to employ a method of adding the data of a version to the respective hot spot data, and comparing between the versions.

According to the fifth embodiment, the user can always refer to the newest hot spot position data. Thus, when the user goes to the location of the hot spot displayed on the map, it is possible to protect the occurrence of the erroneous data such as the case that the hot spot can not be used because of its abolishment.

(Sixth Embodiment)

When the user refers to the map of the hot spots displayed on the display 13, the user can not necessarily use all of the displayed hot spots. So, when the user refers to the map of the hot spots displayed on the display 13, the displaying operation is carried out such that the user can judge whether the displayed hot spots are in the condition in which the user can use them or in the condition in which the user can not use them unless the user newly carries out a service contract. At the time of the displaying operation on the map, the difference is represented by using a visual method of distinguishing whether or not the hot spot can be used by a color. Due to this method, the user can easily identify the condition of the hot spot.

FIG. 16 is a view showing another data stored in the map data memory 15.

The map data of the respective areas stored in the map data memory 15 includes, for each hot spot, the data indicating whether or not it is in the condition that the user of the data terminal device 10 can use it as shown in FIG. 16. With regard to the hot spot for which the procedure of the service contact and the like are required at the time of the usage, an ID number and a password, which are given to the user in carrying out the procedure of the service contact written in FIG. 16 the like, are inputted from the input section 11. Thus, the corresponding hot spot in the data of the map data memory 15 is set at the usable condition.

Also, the map data of the respective areas stored in the map data memory 115 of the Web server 100 includes, for each hot spot, the data indicating whether or not it is in the condition that each user can use it as shown in FIG. 16. With regard to the hot spot for which the procedure of the service contact and the like are required, the ID number and the password which are given to the user in carrying out the procedure of the service contact written in FIG. 16 and the like are inputted from the input section 11, and they are uploaded to the Web server 100. Thus, the corresponding hot spot in the data of the map data memory 115 is set at the condition that the corresponding user can use it.

In the information terminal device 10, if the hot spot located the closest to the location where the user desires to use the wireless LAN is in the unusable condition, the hot spot having the shortest distance, among the hot spots in the usable condition, from the location where the user desires to use the wireless LAN on the map data can be represented by the first color, and the hot spots other than it can be represented by the second color, and the hot spot located the closest to the location where the user desires to use the wireless LAN although it is in the unusable condition can be represented by a third color.

According to the sixth embodiment, when the user refers to the map of the hot spots, it is possible to narrow down to the usable spots by judging whether the referred hot spot is in the already usable condition or it can not be used without any execution of the new service.

(Seventh Embodiment)

The user, even if going to the hot spot of a destination, can not use it unless carrying out the setting to access the hot spot. So, an authentication data of a hot spot, which the user have ever used, among the hot spots displayed on the map is listed up in advance when the user refers to the access point or the hot spot. Then, the user selects the optimal hot spot from the list at a time of a login, and carries out the accessing operation. Thus, the user can use it only by selecting without again performing the setting on the once-accessed hot spot.

FIG. 17 is a view showing data stored in the memory (not shown) of the information terminal device 10.

In the information terminal device 10, when the wireless LAN is accessed at a certain hot spot, the setting necessary for the access at the hot spot and the data of the authentication of the information terminal device 10 are stored in the information terminal device 10 shown in FIG. 17. The setting and the authentication data are stored for each accessing and for each hot spot. Or, if the setting and the authentication data which are common in the plurality of hot spots can be used, only the information in which the already-stored setting and authentication data without any duplicate storing operation can be commonly used is stored in the information terminal device 10.

According to the seventh embodiment, without again performing the setting on the once-accessed hot spot, the user can use it only by selecting. Thus, the labor of the setting is omitted.

Incidentally, since a GPS apparatus (not shown) is installed in the information terminal device 10, the position of the information terminal device 10 can be detected by the information terminal device 10. The information terminal device 10 can retrieve the area corresponding to the position of the information terminal device 10 from the detected position and the position of the hot spot located the closest to the location of the information terminal device 10 inside the area. In this case, the area corresponding to the position of the information terminal device 10 and the position of the closest hot spot can be retrieved from the zip code or the address corresponding to the detected position of the information terminal device 10.

Also, if the information terminal device 10 is the PHS or the mobile telephone (cellular phone) and if the position of the information terminal device 10 can be detected on the basis of the service area of a base station through a communication with the base station, it is possible to retrieve the area corresponding to the position and the position of the hot spot located the closest to the position of the information terminal device 10 inside the territory.

According to the information terminal device of the present invention, the user can use the wireless LAN even if the user does not know the position of the hot spot.

What is claimed is:

1. An information terminal device comprising:
   a wireless local area network (LAN) access section;
   a search section which searches for wireless LAN access hot spot data based on user criteria for wireless LAN locations in or near places not currently in a reception range of the wireless LAN access section where a user desires to relocate to access a wireless LAN,
   wherein said wireless LAN access hot spot criteria include a telephone number in an area where a user desires wireless LAN access hot spot location data;
   a display section which displays the wireless LAN access hot spot data indicating locations of the wireless LAN access hotspots; and
   a first memory section which stores a first table data including a relationship between a plurality of telephone numbers and a plurality of hot spots, wherein each of said plurality of telephone numbers corresponds to one of said plurality of hot spots, said plurality of hot spots is in or near a place corresponding to one of said plurality of telephone numbers,
   wherein said search section searches said hot spot based on said first table data.

2. The information terminal device according to claim 1, wherein said first table data further includes a data indicating a relationship between said plurality of telephone numbers and a plurality of maps each of which corresponds to said plurality of hot spots,
   each of said plurality of telephone numbers corresponds to one of said plurality of maps, and
   said display section displays said one of plurality of maps.

3. The information terminal device according to claim 1, wherein said wireless LAN access hot spot data includes an area code for a telephone number in an area where a user desires wireless LAN access hot spot position data,
   said search section searches an area map data indicating a map of an area which corresponds to said area code,
   said display section displays said area map data searched by said search section, and
   said search section searches said hot spot data of said hot spot in or near a specific area which is a part of said area and selected by said user.

4. The information terminal device according to claim 1, wherein said wireless LAN access hot spot data includes a zip code for an area where a user desires wireless LAN access hot spot hot spot position data,
   said search section searches an area map data indicating a map of an area which corresponds to said zip code, said display section displays said area map data searched by said search section, and said search section searches said hot spot data of said hot spot in or near a specific area which is a part of said area and selected by said user.

5. The information terminal device according to claim 1, wherein said hot spot data includes a first map data indicating a first area containing said place of said hot spot, said display section displays one of said first map data and a second map data indicating a second area containing said first area, and said display section displays places of hot spots which are in said second area except for said first area.

6. The information terminal device according to claim 1, wherein said search section updates said hot spot data without any operation by said user.

7. The information terminal device according to claim 1, wherein said display section displays a first hot spot and a second hot spot distinguishably, said first hot spot can be used for said user, and said second hot spot can not be used for said user.

8. The information terminal device according to claim 1, further comprising:

a memory which stores a setting data that is used for accessing said wireless LAN in said hot spot and was stored when accessing said wireless LAN last time in said hot spot.

9. The information terminal device according to claim 1, wherein said wireless LAN location criteria are inputted by said user.

10. A information terminal device comprising:

a wireless local area network (LAN) accesses section;

a sending section which sends to a server user generated wireless LAN access hot spot criteria for wireless LAN locations in or near places not currently in a reception range of said wireless LAN access section where a user desires to relocate to access a wireless LAN;

a receiving section which receives wireless LAN access hot spot data from said server, wherein said wireless LAN access hot spot data indicates wireless LAN locations in or near places not currently in a reception range of the wireless LAN access section where a user desires to relocate to access a wireless LAN;

a first memory section which stores a first table data including a relationship between a plurality of telephone numbers and a plurality of hot spots, wherein each of said plurality of telephone numbers corresponds to one of said plurality of hot spots, said plurality of hot spots is in or near a place corresponding to one of said plurality of telephone numbers, wherein said search section searches said hot spot based on said first table data; and a display section which displays said wireless LAN access hot spot data.

11. An information terminal device comprising:

a wireless local area network (LAN) access section;

a search section which searches for wireless LAN access hot spot data based on user criteria for wireless LAN locations in or near places not currently in a reception range of the wireless LAN access section where a user desires to relocate to access a wireless LAN, wherein said wireless LAN access hot spot data includes an address in an area where the user desires wireless LAN access hot spot position data;

a display section which displays the wireless LAN access hot spot data indicating locations of the wireless LAN access hotspots; and a second memory section which stores a second table data including a relationship between a plurality of addresses and a plurality of hot spots, wherein each of said plurality of addresses corresponds to one of said plurality of hot spots, said plurality of hot spots is in or near a place corresponding to one of said plurality of addresses, wherein said search section searches said hot spot based on said second table data.

12. The information terminal device according to claim 2, wherein said second table data further includes a data indicating a relationship between said plurality of addresses and a plurality of maps each of which corresponds to said plurality of hot spots, each of said plurality of addresses corresponds to one of said plurality of maps, and said display section displays said one of plurality of maps.

13. A PC card connected with an information terminal device having a display section and used for accessing a wireless local area network (LAN), comprising:

a search section which searches for wireless LAN access hotspot data based on user criteria for wireless LAN locations in or near places not currently in a reception range of the wireless LAN access section where a user desires to relocate to access a wireless LAN; and a first memory section which stores a first table data including a relationship between a plurality of telephone numbers and a plurality of hot spots, wherein each of said plurality of telephone numbers corresponds to one of said plurality of hot spots, said plurality of hot spots is in or near a place corresponding to one of said plurality of telephone numbers, wherein said wireless LAN access hot spot criteria include a telephone number in an area where a user desires wireless LAN access hot spot location data, and wherein said search section searches said hot spot based on said first table data and outputs said wireless LAN access hot spot data to said display section.

14. The PC card according to claim 13, wherein said first table data further includes a data indicating a relationship between said plurality of telephone numbers and a plurality of maps each of which corresponds to said plurality of hot spots, each of said plurality of telephone numbers corresponds to one of said plurality of maps, and said search section outputs a signal for displaying said one of plurality of maps by said display sections.

15. The PC card according to claim 13, wherein said second table data further includes a data indicating a relationship between said plurality of addresses and a plurality of maps each of which corresponds to said plurality of hot spots, each of said plurality of addresses corresponds to one of said plurality of maps, and said search section outputs a signal to be display said one of plurality of maps by said display sections.

16. The PC card according to claim 13, said wireless LAN access hot spot data includes an area code for a telephone number in an area where a user desires wireless LAN access hot spot position data, said search section searches an area map data indicating a map of an area which corresponds to said area code, said search section outputs a signal for displaying said area map data by said display section, and said search section searches said hot spot data of said hot spot in or near a specific area which is a part of said area and selected by said user.

17. The PC card according to claim 13, wherein said wireless LAN access hot spot data includes a zip code for an area where a user desires wireless LAN access hot spot hot spot position data,
- said search section searches an area map data indicating a map of an area which corresponds to said zip code,
- said search section outputs a signal for displaying said area map data by said display section, and
- said search section searches said hot spot data of said hot spot in or near a specific area which is a part of said area and selected by said user.

18. The PC card according to claim 13, wherein said hot spot data includes a first map data indicating a first area containing said place of said hot spot,
- said search section outputs a signal for displaying one of said first map data and a second map data indicating a second area containing said first area, and
- said search section outputs a signal for displaying places of hot spots which are in said second area except for said first area.

19. The PC card according to claim 13, wherein said search section updates said hot spot data without any operation by said user.

20. The PC card according to claim 13, wherein said search section outputs a signal for displaying a first hot spot and a second hot spot distinguishably, said first hot spot can be used for said user, and said second hot spot can not be used for said user.

21. The PC card according to claim 13, further comprising:
- a memory which stores a setting data that is used for accessing said wireless LAN in said hot spot and was stored when accessing said wireless LAN last time in said hot spot.

22. A PC card which is connected with an information terminal device having a display section and used for accessing a wireless local area network (LAN), the PC card comprising:
- a sending request outputting section which outputs a request that a server send wireless LAN access hot spot data based on user criteria for wireless LAN locations in or near places not currently in a reception range of the wireless LAN access section where a user desires to relocate to access a wireless LAN;
- a first table data storing section which stores a first table data including a relationship between a plurality of telephone numbers and a plurality of hot spots, wherein each of said plurality of telephone numbers corresponds to one of said plurality of hot spots, said plurality of hot spots is in or near a place corresponding to one of said plurality of telephone numbers,
- wherein said sending request outputting section outputs a request that a server send wireless LAN access hot spot data based on said first table data; and
- an output request outputting section which outputs a request that said display section display said wireless LAN access hot spot data received from said server.

23. A PC card connected with an information terminal device having a display section and used for accessing a wireless local area network (LAN), comprising:
- a search section which searches for wireless LAN access hotspot data based on user criteria for wireless LAN locations in or near places not currently in a reception range of the wireless LAN access section where a user desires to relocate to access a wireless LAN; and
- a second memory section which stores a second table data including a relationship between a plurality of addresses and a plurality of hot spots, wherein each of said plurality of addresses corresponds to one of said plurality of hot spots, said plurality of hot spots is in or near a place corresponding to one of said plurality of addresses,
- wherein said wireless LAN access hot spot data includes an address in an area where the user desires wireless LAN access hot spot position data, and
- wherein said search section searches said hot spot based on said second table data.

24. A method of finding wireless LAN access hot spots in or near wireless LAN locations where a user desires to relocate to access a wireless LAN, the method comprising:
- storing in a first memory section a first table data including a relationship between a plurality of telephone numbers and a plurality of hot spots, wherein each of said plurality of telephone numbers corresponds to one of said plurality of hot spots, said plurality of hot spots is in or near a place corresponding to one of said plurality of telephone numbers;
- sending to a server user generated wireless LAN access hot spot criteria based on said first table data for wireless LAN locations in or near places not currently in a reception range of the wireless LAN access section where a user desires to relocate to access a wireless LAN,
- wherein said server searches said hot spot based on said first table data;
- receiving wireless LAN access hot spot data from said server, wherein said wireless LAN access hot spot data indicates wireless LAN locations in or near places not currently in a reception range of the wireless LAN access section where a user desires to relocate to access a wireless LAN; and
- displaying said wireless LAN access hot spot data.

25. A method of finding wireless LAN access hot spots in or near wireless LAN locations where a user desires to relocate to access a wireless LAN, the method comprising:
- searching first table data for wireless LAN access hot spot data based on user criteria for wireless LAN locations in or near places not currently in a reception range of the wireless LAN access section where a user desires to relocate to access a wireless LAN,
- wherein said wireless LAN access hot spot criteria include a telephone number in an area where a user desires wireless LAN access hot spot location data, and
- wherein said first table data includes a relationship between a plurality of telephone numbers and a plurality of hot spots, each of said plurality of telephone numbers corresponds to one of said plurality of hot spots, and said plurality of hot spots is in or near a place corresponding to one of said plurality of telephone numbers; and
- displaying said wireless LAN access hot spot data based on a searching result.

26. The method of finding a hot spot according to claim 25, wherein said first table data further includes a data indicating a relationship between said plurality of telephone numbers and a plurality of maps each of which corresponds to said plurality of hot spots,
- each of said plurality of telephone numbers corresponds to one of said plurality of maps, and
- said step of displaying said hot spot data displaying said one of plurality of maps.

27. A method of finding wireless LAN access hot spots in or near wireless LAN locations where a user desires to relocate to access a wireless LAN, the method comprising:

searching second table data for wireless LAN access hot spot data based on user criteria for wireless LAN locations in or near places not currently in a reception range of the wireless LAN access section where a user desires to relocate to access a wireless LAN, wherein said wireless LAN access hot spot data includes an address in an area where the user desires wireless LAN access hot spot position data, and wherein said second table data includes a relationship between a plurality of addresses and a plurality of hot spots, each of said plurality of addresses corresponds to one of said plurality of hot spots, and said plurality of hot spots is in or near a place corresponding to one of said plurality of addresses; and displaying said wireless LAN access hot spot data based on a searching result.

28. The method of finding a hot spot according to claim 27, wherein said second table data further includes a data indicating a relationship between said plurality of addresses and a plurality of maps each of which corresponds to said plurality of hot spots, each of said plurality of addresses corresponds to one of said plurality of maps, and said step of displaying said hot spot data displaying said one of plurality of maps.

29. A computer program product embodied on a computer-readable medium and comprising code that, when executed for a method of finding wireless LAN access hot spots in or near wireless LAN locations where a user desires to relocate to access a wireless LAN, causes a computer to perform the following:

storing in a first memory section a first table data including a relationship between a plurality of telephone numbers and a plurality of hot spots, wherein each of said plurality of telephone numbers corresponds to one of said plurality of hot spots, said plurality of hot spots is in or near a place corresponding to one of said plurality of telephone numbers;

sending to a server user generated wireless LAN access hot spot criteria based on said first table data for locations in or near places not currently in a reception range of the wireless LAN access section where a user desires to relocate to access a wireless LAN, wherein said server searches said hot spot based on said first table data;

receiving wireless LAN access hot spot data from said server, wherein said wireless LAN access hot spot data indicates wireless LAN locations in or near places not currently in a reception range of the wireless LAN access section where a user desires to relocate to access a wireless LAN;

displaying said wireless LAN access hot spot data.

30. A computer program product embodied on a computer-readable medium and comprising code that, when executed for a method of finding wireless LAN access hot spots in or near wireless LAN locations where a user desires to relocate to access a wireless LAN, causes a computer to perform the following:

searching first table data for wireless LAN access hot spot data based on user criteria for wireless LAN locations in or near places not currently in a reception range of the wireless LAN access section where a user desires to relocate to access a wireless LAN, wherein said wireless LAN access hot spot criteria include a telephone number in an area where a user desires wireless LAN access hot spot location data, and wherein said first table data includes a relationship between a plurality of telephone numbers and a plurality of hot spots, each of said plurality of telephone numbers corresponds to one of said plurality of hot spots, and said plurality of hot spots is in or near a place corresponding to one of said plurality of telephone numbers; and displaying said wireless LAN access hot spot data based on a searching result.

31. The computer program product according to claim 30, wherein said first table data further includes a data indicating a relationship between said plurality of telephone numbers and a plurality of maps each of which corresponds to said plurality of hot spots, each of said plurality of telephone numbers corresponds to one of said plurality of maps, and said step of displaying said hot spot data displaying said one of plurality of maps.

32. A computer program product embodied on a computer-readable medium and comprising code that, when executed for a method of finding wireless LAN access hot spots in or near wireless LAN locations where a user desires to relocate to access a wireless LAN, causes a computer to perform the following:

searching second table data for wireless LAN access hot spot data based on user criteria for wireless LAN locations in or near places not currently in a reception range of the wireless LAN access section where a user desires to relocate to access a wireless LAN, wherein said wireless LAN access hot spot data includes an address in an area where the user desires wireless LAN access hot spot position data, and wherein said second table data includes a relationship between a plurality of addresses and a plurality of hot spots, each of said plurality of addresses corresponds to one of said plurality of hot spots, and said plurality of hot spots is in or near a place corresponding to one of said plurality of addresses; and displaying said wireless LAN access hot spot data based on a searching result.

33. The computer program product according to claim 32, wherein said second table data further includes a data indicating a relationship between said plurality of addresses and a plurality of maps each of which corresponds to said plurality of hot spots, each of said plurality of addresses corresponds to one of said plurality of maps, and said step of displaying said hot spot data displaying said one of plurality of maps.

* * * * *

UNITED STATES PATENT AND TRADEMARK OFFICE
CERTIFICATE OF CORRECTION

PATENT NO. : 7,164,923 B2  Page 1 of 1
APPLICATION NO. : 10/724153
DATED : January 16, 2007
INVENTOR(S) : Yasunori Tsunomoto and Yoshikazu Kobayashi It is certified that error appears in the above-identified patent and that said Letters Patent is hereby corrected as shown below:

Col. 4, Line 48 Delete "The each" and insert -- Each --.

Col. 9, Line 5,7,14,21 Delete "is" and insert -- are --.

Col. 16, Line 22 Delete "step 55" and insert -- S55 --.

Col. 24, Line 55 (Claim 15) Delete "display" and insert -- displayed --.

Col. 24, Line 57 (Claim 16 should read):

-- 16. The information terminal device according to claim 1, wherein said wireless LAN access hot spot data is the place which the information terminal device detects. --.

Signed and Sealed this

Twenty-third Day of September, 2008

JON W. DUDAS
*Director of the United States Patent and Trademark Office*